US012687700B2

(12) United States Patent
Sin

(10) Patent No.: US 12,687,700 B2
(45) Date of Patent: Jul. 21, 2026

(54) OPTICAL SYSTEM AND CAMERA MODULE COMPRISING SAME

(71) Applicant: LG INNOTEK CO., LTD., Seoul (KR)

(72) Inventor: Doo Shik Sin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 263 days.

(21) Appl. No.: 18/706,060

(22) PCT Filed: Nov. 11, 2022

(86) PCT No.: PCT/KR2022/017805
§ 371 (c)(1),
(2) Date: Apr. 30, 2024

(87) PCT Pub. No.: WO2023/085870
PCT Pub. Date: May 19, 2023

(65) Prior Publication Data
US 2025/0013013 A1 Jan. 9, 2025

(30) Foreign Application Priority Data
Nov. 11, 2021 (KR) ........................ 10-2021-0155170

(51) Int. Cl.
G02B 13/00 (2006.01)
G02B 9/64 (2006.01)
G03B 30/00 (2021.01)

(52) U.S. Cl.
CPC ........... *G02B 13/0045* (2013.01); *G02B 9/64* (2013.01); *G03B 30/00* (2021.01)

(58) Field of Classification Search
CPC .. G02B 13/0045; G02B 9/64; G02B 15/1421; G03B 30/00
(Continued)

(56) References Cited

U.S. PATENT DOCUMENTS 10,983,311 B2 4/2021 Zhang et al.
11,860,342 B2 1/2024 Park et al.
(Continued)

FOREIGN PATENT DOCUMENTS

CN 107436481 12/2017
CN 112578534 3/2021
(Continued)

OTHER PUBLICATIONS

International Search Report dated Feb. 21, 2023 issued in Application No. PCT/KR2022/017805.

*Primary Examiner* — James R Greece
(74) *Attorney, Agent, or Firm* — KED & ASSOCIATES, LLP

(57) ABSTRACT

The optical system disclosed in the embodiment of the invention includes first to seventh lenses disposed along an optical axis from an object side to a sensor side, the first lens has positive (+) refractive power on the optical axis, and the seventh lens has negative refractive power on the optical axis, an object-side surface of the first lens has a convex shape on the optical axis, and the sensor-side surface of the third lens has a minimum effective diameter among the first to seventh lenses. The sensor-side surface of the seventh lens has a maximum effective diameter among the first to seventh lenses, and may satisfy the following equations: $0.4 < TTL/ImgH < 3$ and $1 < CA\_Max/CA\_Min < 5$ (TTL (Total track length) is a distance on the optical axis from an apex of the object-side surface of the first lens to the upper surface of an image sensor, ImgH is ½ of the maximum diagonal length of the image sensor, CA_Max is the largest effective diameter among the effective diameters of the object-side and sensor-side surfaces of the first to seventh lenses, and CA_Min is the smallest effective diameter among the effec-
(Continued)

tive diameters of the object-side and sensor-side surfaces of the first to seventh lenses).

20 Claims, 7 Drawing Sheets

(58) Field of Classification Search
USPC ................................................... 359/708, 755
See application file for complete search history.

(56) References Cited

U.S. PATENT DOCUMENTS

| | | | | |
|---|---|---|---|---|
| 2019/0121098 | A1* | 4/2019 | Zhou ................. | G02B 13/0045 |
| 2020/0174228 | A1 | 6/2020 | Chen et al. | |
| 2021/0124151 | A1 | 4/2021 | Noh et al. | |

FOREIGN PATENT DOCUMENTS

| | | | |
|---|---|---|---|
| JP | 2000-028919 | 1/2000 | |
| JP | 2015-072402 | 4/2015 | |
| KR | 10-2020-0102323 | 8/2020 | |
| KR | 10-2021-0044553 | 4/2021 | |
| KR | 10-2021-0050646 | 5/2021 | |
| WO | WO-2023224441 A1 * | 11/2023 | ......... G02B 13/0045 |

* cited by examiner

FIG. 3

| R | L1 S1 | L1 S2 | L2 S1 | L2 S2 | L3 S1 | L3 S2 | L4 S1 | L4 S2 | L5 S1 | L5 S2 | L6 S1 | L6 S2 | L7 S1 | L7 S2 |
|---|---|---|---|---|---|---|---|---|---|---|---|---|---|---|
|  | 2.803 | 5.394 | 6.474 | -79.316 | 10.058 | 4.741 | -35.230 | -18.271 | -8.165 | 103.878 | 2.590 | 6.380 | 5.371 | 2.062 |
| C2 | 1.82.E+00 | 1.76.E+00 | 1.71.E+00 | 1.66.E+00 | 1.58.E+00 | 1.45.E+00 | 1.75.E+00 | 2.09.E+00 | 2.94.E+00 | 3.21.E+00 | 3.69.E+00 | 3.90.E+00 | 5.51.E+00 | 5.80.E+00 |
| C1 | -2.56.E+00 | -5.04.E+01 | -8.97.E+01 | -8.08.E+01 | -6.64.E+00 | -7.60.E-01 | 9.50.E-01 | 3.15.E+01 | 5.63.E-01 | 0.00.E+00 | -3.24.E+00 | -1.40.E+01 | -7.87.E+01 | -8.14.E+00 |
| C4 | -3.96.E-02 | -5.84.E-02 | 9.08.E-02 | -3.99.E-02 | -3.18.E-02 | 2.66.E-03 | -2.26.E-01 | -3.08.E-01 | 1.59.E-02 | -8.51.E-01 | -2.92.E+00 | -1.95.E+00 | -3.85.E+00 | -5.12.E+00 |
| C5 | -2.78.E-02 | -8.79.E-03 | 8.36.E-03 | -8.38.E-03 | 3.21.E-03 | 7.05.E-03 | -1.63.E-02 | 1.57.E-02 | 8.67.E-02 | 3.65.E-01 | 5.66.E-01 | -8.77.E-02 | 1.79.E+00 | 1.47.E+00 |
| C6 | 1.02.E-03 | 8.70.E-03 | 4.48.E-03 | 3.40.E-03 | 5.41.E-03 | 1.91.E-03 | 2.95.E-03 | 1.85.E-02 | -3.65.E-02 | -1.44.E-01 | 5.71.E-02 | 2.07.E-01 | -9.44.E-01 | -5.88.E-01 |
| C7 | 1.37.E-03 | -1.63.E-03 | -3.12.E-03 | -9.42.E-04 | -1.55.E-04 | 1.37.E-04 | -1.09.E-03 | -7.73.E-03 | -2.01.E-02 | 1.66.E-02 | -9.38.E-02 | -2.76.E-02 | 1.51.E-01 | 3.75.E-02 |
| C8 | 1.34.E-04 | 1.16.E-04 | 5.79.E-05 | 4.44.E-04 | 3.32.E-04 | 8.02.E-05 | -5.51.E-04 | -4.57.E-03 | 1.05.E-02 | 5.75.E-03 | -5.17.E-02 | -3.59.E-03 | -1.66.E-01 | -1.16.E-01 |
| C9 | -8.58.E-05 | -9.78.E-05 | -1.00.E-04 | -2.16.E-04 | -8.05.E-05 | -4.13.E-06 | -3.34.E-04 | -6.29.E-04 | 2.37.E-03 | 5.42.E-03 | 1.51.E-02 | -2.45.E-02 | -9.19.E-02 | -3.51.E-02 |
| C10 | -4.13.E-05 | 6.07.E-06 | -4.44.E-05 | -9.61.E-05 | -4.60.E-05 | 5.56.E-06 | 1.46.E-04 | 8.67.E-04 | -5.32.E-03 | -8.08.E-03 | -1.38.E-03 | 6.89.E-04 | -1.24.E-01 | -8.13.E-02 |
| C11 | -1.82.E-05 | -2.16.E-05 | -3.62.E-05 | 2.96.E-05 | 2.12.E-05 | -6.29.E-06 | 1.20.E-04 | 3.09.E-04 | 1.43.E-03 | 2.21.E-03 | -2.22.E-02 | -3.35.E-03 | -4.32.E-02 | -2.12.E-02 |
| C12 | -1.49.E-05 | -7.10.E-06 | -1.83.E-06 | -9.63.E-06 | -9.34.E-06 | 3.18.E-07 | 1.45.E-04 | 1.30.E-04 | 1.82.E-03 | 1.77.E-03 | -1.78.E-02 | -9.17.E-04 | -6.05.E-02 | -4.57.E-02 |
| C13 | -2.10.E-06 | -1.18.E-05 | -5.87.E-07 | 2.10.E-05 | 1.19.E-05 | -1.05.E-06 | 5.35.E-05 | -1.89.E-05 | -7.73.E-04 | -1.35.E-03 | -7.43.E-03 | -3.38.E-03 | -2.83.E-02 | -6.01.E-03 |
| C14 | -1.26.E-06 | -5.99.E-06 | -1.15.E-05 | -1.14.E-05 | -8.04.E-06 | 2.18.E-06 | 3.29.E-05 | 2.88.E-05 | 9.83.E-05 | 7.36.E-05 | -5.40.E-03 | 1.63.E-03 | -2.03.E-02 | 5.16.E-03 |
| C15 | 1.16.E-05 | 8.08.E-06 | -5.91.E-06 | 8.10.E-06 | 9.69.E-06 | 1.88.E-07 | -1.47.E-06 | 9.53.E-06 | 3.05.E-04 | 4.07.E-04 | -6.39.E-03 | 2.12.E-03 | -1.10.E-02 | 1.53.E-02 |
| C16 | 7.49.E-06 | 8.22.E-06 | -5.56.E-07 | -1.37.E-05 | -4.32.E-06 | 1.86.E-06 | 6.48.E-06 | 2.55.E-06 | -1.06.E-05 | -5.32.E-05 | -4.62.E-03 | 8.79.E-03 | -8.46.E-03 | 6.98.E-03 |
| C17 | 1.07.E-06 | 8.62.E-06 | -2.81.E-06 | 4.48.E-07 | -8.35.E-08 | -1.19.E-06 | -6.55.E-06 | -1.80.E-05 | -3.22.E-05 | -4.05.E-05 | -1.32.E-03 | 2.65.E-04 | 8.39.E-04 | 4.96.E-03 |

FIG. 4

| Y(mm) | d12 | d23 | d34 | d45 | d56 | d57 |
|---|---|---|---|---|---|---|
| 0 | 0.2184 | 0.03 | 0.7263 | 0.4826 | 0.2463 | 1.7272 |
| 0.1 | 0.2183 | 0.0306 | 0.7251 | 0.4823 | 0.2482 | 1.7274 |
| 0.2 | 0.2178 | 0.0322 | 0.7215 | 0.4812 | 0.2539 | 1.7276 |
| 0.3 | 0.2171 | 0.035 | 0.7155 | 0.4795 | 0.2634 | 1.7273 |
| 0.4 | 0.2161 | 0.0388 | 0.707 | 0.4771 | 0.2769 | 1.7258 |
| 0.5 | 0.215 | 0.0436 | 0.6958 | 0.474 | 0.2943 | 1.7222 |
| 0.6 | 0.2139 | 0.0494 | 0.6819 | 0.4704 | 0.3158 | 1.7156 |
| 0.7 | 0.2129 | 0.0561 | 0.6649 | 0.4664 | 0.3413 | 1.7052 |
| 0.8 | 0.2122 | 0.0637 | 0.6445 | 0.4623 | 0.3708 | 1.6906 |
| 0.9 | 0.2122 | 0.0722 | 0.6201 | 0.4585 | 0.4039 | 1.6713 |
| 1 | 0.2135 | 0.0816 | 0.591 | 0.4554 | 0.4403 | 1.6472 |
| 1.1 | 0.2166 | 0.0919 | 0.5561 | 0.4538 | 0.4793 | 1.6183 |
| 1.2 | 0.2227 | 0.1034 | 0.5137 | 0.4545 | 0.5203 | 1.585 |
| 1.3 | 0.233 | 0.1165 | 0.4619 | 0.458 | 0.5626 | 1.5475 |
| 1.4 | 0.2487 | 0.1327 | 0.3974 | 0.4648 | 0.6054 | 1.5061 |
| 1.5 | 0.2709 | 0.1542 | 0.3974 | 0.4748 | 0.6483 | 1.4612 |
| 1.6 | 0.3 | 0.1542 | | 0.4876 | 0.6906 | 1.4133 |
| 1.7 | 0.334 | | | 0.5016 | 0.7314 | 1.3626 |
| 1.8 | 0.334 | | | 0.5149 | 0.7692 | 1.3098 |
| 1.9 | | | | 0.5274 | 0.8019 | 1.2555 |
| 2 | | | | 0.5444 | 0.8262 | 1.2004 |
| 2.1 | | | | 0.5444 | 0.8388 | 1.1455 |
| 2.2 | | | | | 0.8361 | 1.0917 |
| 2.3 | | | | | 0.8157 | 1.04 |
| 2.4 | | | | | 0.7761 | 0.9916 |
| 2.5 | | | | | 0.7181 | 0.9476 |
| 2.6 | | | | | 0.6444 | 0.9095 |
| 2.7 | | | | | 0.5606 | 0.879 |
| 2.8 | | | | | 0.4749 | 0.858 |
| 2.9 | | | | | 0.3966 | 0.8484 |
| 3 | | | | | 0.3323 | 0.8515 |
| 3.1 | | | | | 0.2842 | 0.8678 |
| 3.2 | | | | | 0.2842 | 0.8965 |
| 3.3 | | | | | | 0.9359 |
| 3.4 | | | | | | 0.9839 |
| 3.5 | | | | | | 1.0375 |
| 3.6 | | | | | | 1.0909 |
| 3.7 | | | | | | 1.1383 |
| 3.8 | | | | | | 1.1893 |
| 3.9 | | | | | | 1.1893 |
| 4 | | | | | | |

1

OPTICAL SYSTEM AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2022/017805, filed Nov. 11, 2022, which claims priority to Korean Patent Application No. 10-2021-0155170, filed Nov. 11, 2021, whose entire disclosures are hereby incorporated by reference.

TECHNICAL FIELD

An embodiment relates to an optical system for improved optical performance and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooning up or zooning out by increasing or decreasing the magnification of a remote object through a zoom lens. In addition, the camera module employs an image stabilization (IS) technology to correct or prevent image stabilization due to an unstable fixing device or a camera movement caused by a user's movement.

The most important element for the camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted.

However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. In addition, the size of the image sensor is increasing to realize high-resolution and high-definition. However, when the size of the image sensor increases, the TTL (Total Track Length) of the optical system including the plurality of lenses also increases, thereby increasing the thickness of the camera and the mobile terminal including the optical system. Therefore, a new optical system capable of solving the above problems is required.

2

DISCLOSURE

Technical Problem

An embodiment of the invention provides an optical system with improved optical properties. The embodiment provides an optical system having excellent optical performance at the center and periphery portions of the field of view. The embodiment provides an optical system capable of having a slim structure.

Technical Solution

An optical system according to an embodiment of the invention comprises first to seventh lenses disposed along an optical axis from an object side to a sensor side, the first lens has positive (+) refractive power on the optical axis, the seventh lens has negative refractive power on the optical axis, an object-side surface of the first lens has a convex shape on the optical axis, a sensor-side surface of the third lens has a minimum effective diameter in the first to seventh lenses, a sensor-side surface of the seventh lens has a maximum effective diameter in the first to seventh lenses, and the following equations may satisfy: $0.4<TTL/ImgH<3$ and $1<CA\_Max/CA\_Min<5$. (TTL (Total track length) is a distance on the optical axis from an apex of the object-side surface of the first lens to the upper surface of an image sensor, ImgH is ½ of the maximum diagonal length of the image sensor, CA_Max is the largest effective diameter among the effective diameters of the object-side and sensor-side surfaces of the first to seventh lenses, and CA_Min is the smallest effective diameter among the effective diameters of the object-side and sensor-side surfaces of the first to seventh lenses.).

According to an embodiment of the invention, the third and seventh lenses satisfy: $2<AVR\_CA\_L7/AVR\_CA\_L3<4$, where AVR_CA_L7 is an average value of the effective diameters of the object-side surface and the sensor-side surface of the seventh lens, and AVR_CA_L3 is an average value of the effective diameters of the object-side surface and the sensor-side surface of the third lens.

According to an embodiment of the invention, the effective diameter of the object-side surface of the seventh lens satisfies: $2\leq CA\_L7S1/AVR\_CA\_L3<4$, where CA_L7S1 is the effective diameter (mm) of the object-side surface of the seventh lens, and AVR_CA_L3 is an average value of the effective diameters of the object-side surface and the sensor-side surface of the third lens. The effective diameters of the sensor-side surface of the seventh lens satisfies: $2\leq CA\_L7S2/AVR\_CA\_L3<5$, where CA_L7S2 is the effective diameter (mm) of the sensor-side surface of the seventh lens, and AVR_CA_L3 is an average value of the effective diameters of the object-side and sensor-side surfaces of the of the third lens.

According to an embodiment of the invention, the first and seventh lenses satisfy the following equation: $1<L1\_CT/L7\_CT<5$, where L1_CT is a thickness of the first lens on the optical axis, and L7_CT is a thickness of the seventh lens on the optical axis.

According to an embodiment of the invention, a distance between the third and fourth lenses on the optical axis and a distance between the sixth and seventh lenses on the optical axis satisfy: $1<d67\_CT/d34\_CT<4$, where d34_CT is the distance (mm) between the third lens and the fourth lens on the optical axis and d67_CT is the distance (mm) from the sensor-side surface of the sixth lens and the object-side surface of the seventh lens on the optical axis OA.

According to an embodiment of the invention, the effective diameter of the sensor-side surface of the seventh lens and a distance between the sixth and seventh lenses on the optical axis satisfy: $3<CA\_L7S2/d67\_CT<10$, where $CA\_L7S2$ is the largest effective diameter of the lens surface and is the effective diameter of the sensor-side surface of the seventh lens, and $d67\_CT$ is a distance (mm) from the sensor-side surface of the sixth lens and the object-side surface of the seventh lens on the optical axis OA.

According to an embodiment of the invention, the sensor-side surface of the seventh lens has a critical point, the following equation satisfies: $0.5<L7S2\_Max\_sag$ to Sensor$<2$, where $L7S2\_Max\_sag$ to Sensor is a distance in a direction of the optical axis from the maximum sag value of the sensor-side surface of the seventh lens to the image sensor.

An optical system according to an embodiment of the invention comprises first and second lens groups disposed along an optical axis from an object side toward a sensor side and including at least one lens, wherein the first lens group has a positive (+) refractive power on the optical axis, the second lens group has a negative (−) refractive power on the optical axis, the total sum of the number of lenses included in the first and second lens groups is 7, the number of lenses of the second lens group is greater than the number of lenses of the first lens group, an effective diameter of the sensor-side surface closest to the second lens group among the lens surfaces of the first lens group is the minimum, the effective diameter of the sensor-side surface closest to the image sensor among the lens surfaces of the second lens group is the maximum, the following equations satisfies: $0.4<TTL/ImgH<3$ and $0.5<TD/CA\_Max<1.5$, where TTL (Total track length) is a distance from the apex of the object-side surface of the first lens to the upper surface of the image sensor in the optical axis, ImgH is ½ of the maximum diagonal length of the image sensor, and TD is a maximum distance (mm) from an object-side surface of the first lens group to a sensor-side surface of the second lens group in the optical axis, and $CA\_Max$ is the largest effective diameter among the effective diameters of the object-side surfaces and the sensor-side surfaces of the first to seventh lenses.

According to an embodiment of the invention, the absolute value of the focal length of each of the first and second lens groups may be greater in the first lens group than in the second lens group.

According to an embodiment of the invention, the sensor-side surface of the first lens group closest to the second lens group among lens surfaces of the first and second lens groups has a minimum effective diameter, and a sensor-side surface of the second lens group closest to the image sensor among the lens surfaces of the first and second lens groups may have a maximum effective diameter.

According to an embodiment of the invention, the first lens group includes first to third lenses disposed along the optical axis from the object side toward the sensor side, the second lens group includes fourth to seventh lenses disposed along the optical axis from the object side toward the sensor side, wherein one of the object-side surface and the sensor-side surface of the third lens has a minimum effective diameter, and one of the object-side surface and the sensor-side surface of the seventh lens may have a maximum effective diameter.

According to an embodiment of the invention, a distance on the optical axis between the sixth and seventh lenses and a distance on the optical axis between the third and fourth lenses satisfy: $1<d67\_CT/d34\_CT<4$, where $d34\_CT$ is a distance (mm) on the optical axis between the third lens and the first lens distance, and $d67\_CT$ is a distance (mm) on the optical axis OA between the sensor-side surface of the sixth lens and the object-side surface of the seventh lens.

According to an embodiment of the invention, a distance on the optical axis between the second lens group and the sixth and seventh lenses satisfies: $1<G2\_TD/d67\_CT<4$, where $G2\_TD$ is the maximum distance (mm) on the optical axis from the object-side surface to the sensor-side surface of the second lens group, and $d67\_CT$ is a distance (mm) on the optical axis OA between the sensor-side surface of the sixth lens and the object-side surface of the seventh lens. A distance between the first lens group and the first and second lens groups satisfies: $1<G1\_TD/d34\_CT<4$, where $G1\_TD$ is a distance (mm) on the optical axis from the object-side surface of the first lens to the sensor-side surface of the third lens, and $d34\_CT$ is a distance (mm) on the optical axis between the sensor-side surface of the first lens group and the object-side surface of the second lens group.

According to an embodiment of the invention, a center thickness of the first lens, a distance on the optical axis between the third and fourth lenses, and a center thickness of the sixth lens satisfy: $L1\_CT<d34\_CT<L6\_CT$, where $L1\_CT$ is the center thickness of the first lens, which is the thickest in the first lens group, $d34\_CT$ is the distance on the optical axis between the third and fourth lenses, and $L6\_CT$ is the center thickness of the sixth lens having an critical point in the second lens group.

An optical system according to an embodiment of the invention comprises first to seventh lenses disposed along an optical axis from an object side toward a sensor side, wherein the first lens has positive (+) refractive power on the optical axis, and the seventh lens has negative (−) refractive power on the optical axis, a sensor-side surface of the third lens has a concave shape on the optical axis, and an object-side surface of the fourth lens has a concave shape on the optical axis, at least one of the object-side surface and sensor-side surface of sixth lens has a critical point, at least one of the object-side surface and sensor-side surface of the seventh lens has a critical point, the sensor-side surface of the third lens has the minimum effective diameter among the first to seventh lenses, and the sensor side surface of the seventh lens has the maximum effective diameter size among the first to seventh lenses, the following equation satisfies: $1<CA\_Max/CA\_Min<5$, where $CA\_Max$ is the maximum effective diameter among the effective diameters of the object-side and sensor-side surfaces of the first to seventh lenses, and $CA\_Min$ is the minimum effective diameter among the effective diameters of the object-side and sensor-side surfaces of the first to seventh lenses.

According to an embodiment of the invention, the critical point of the sensor-side surface of the seventh lens is located at a position of 40% or less of a distance from the optical axis to an end of an effective region of the sensor-side surface of the seventh lens, and the critical point on the object-side surface of the seventh lens may be located closer to the optical axis than the critical point on the sensor-side surface of the seventh lens. The critical point of the sensor-side surface and the critical point of the object-side surface of the sixth lens may be located within a range of 46% to 56% of a distance from the optical axis to an end of an effective region of the sixth lens.

A camera module according to an embodiment of the invention includes an image sensor; and a filter between the image sensor and the last lens of the optical system, wherein the optical system includes the optical system disclosed above and the following equation may satisfy: $1\leq F/EPD<5$, where F is the total focal length of the optical system, and EPD is an entrance pupil diameter of the optical system.

Advantageous Effects

The optical system and the camera module according to the embodiment may have improved optical properties. In detail, the optical system may have improved resolution as a plurality of lenses have a set shape, focal length, and the like.

The optical system and the camera module according to the embodiment may have improved distortion and aberration characteristics, and may have good optical performance at the center and periphery portions of the field of view (FOV). The optical system according to the embodiment may have improved optical characteristics and a small total track length (TTL), so that the optical system and a camera module including the same may be provided in a slim and compact structure.

DESCRIPTION OF DRAWINGS

FIG. 3 is data on the aspherical surface coefficient of each lens surface in the optical system of FIG. 1.

FIG. 4 is data on distances between two adjacent lenses in the optical system of FIG. 1.

BEST MODE

Figure 1:
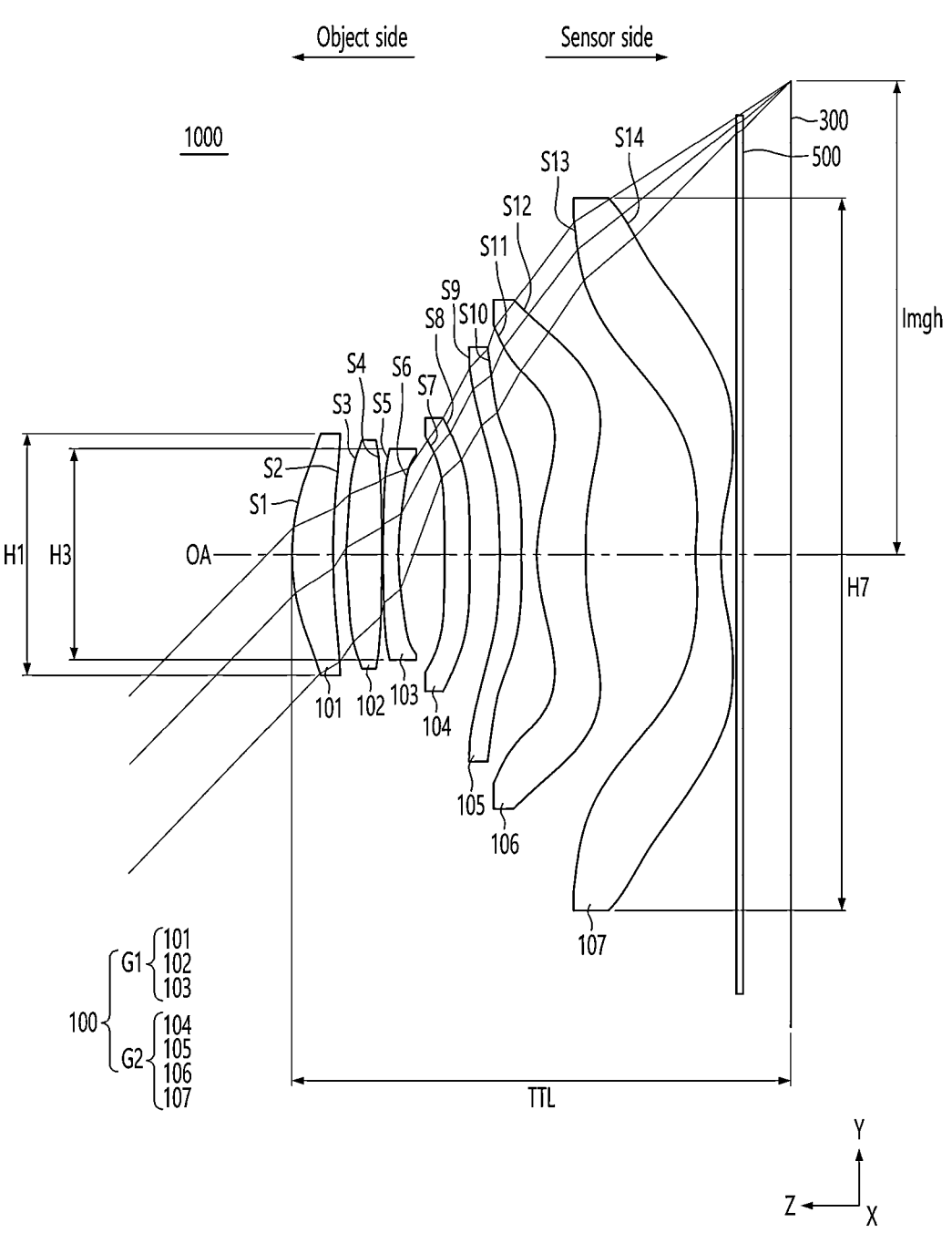
FIG. 1 is a configuration diagram of an optical system according to an embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In the description of the invention, "object-side surface" may refer to a surface of the lens facing the object side with respect to the optical axis OA, and "sensor-side surface" may refer to a surface of the lens facing the imaging surface (image sensor) with respect to the optical axis. A convex surface of the lens may mean that the lens surface on the optical axis has a convex shape, and a concave surface of the lens may mean that the lens surface on the optical axis has a concave shape. A radius of curvature, center thickness, and distance between lenses described in the table for lens data may mean values on the optical axis, and the unit is mm. The vertical direction may mean a direction perpendicular to the optical axis, and an end of the lens or the lens surface may mean the end or edge of the effective region of the lens through which the incident light passes. The size of the effective diameter on the lens surface may have a measurement error of up to ±0.4 mm depending on the measurement method. The paraxial region refers to a very narrow region near the optical axis, and is a region in which a distance at which a light ray falls from the optical axis OA is almost zero.

Figure 2:
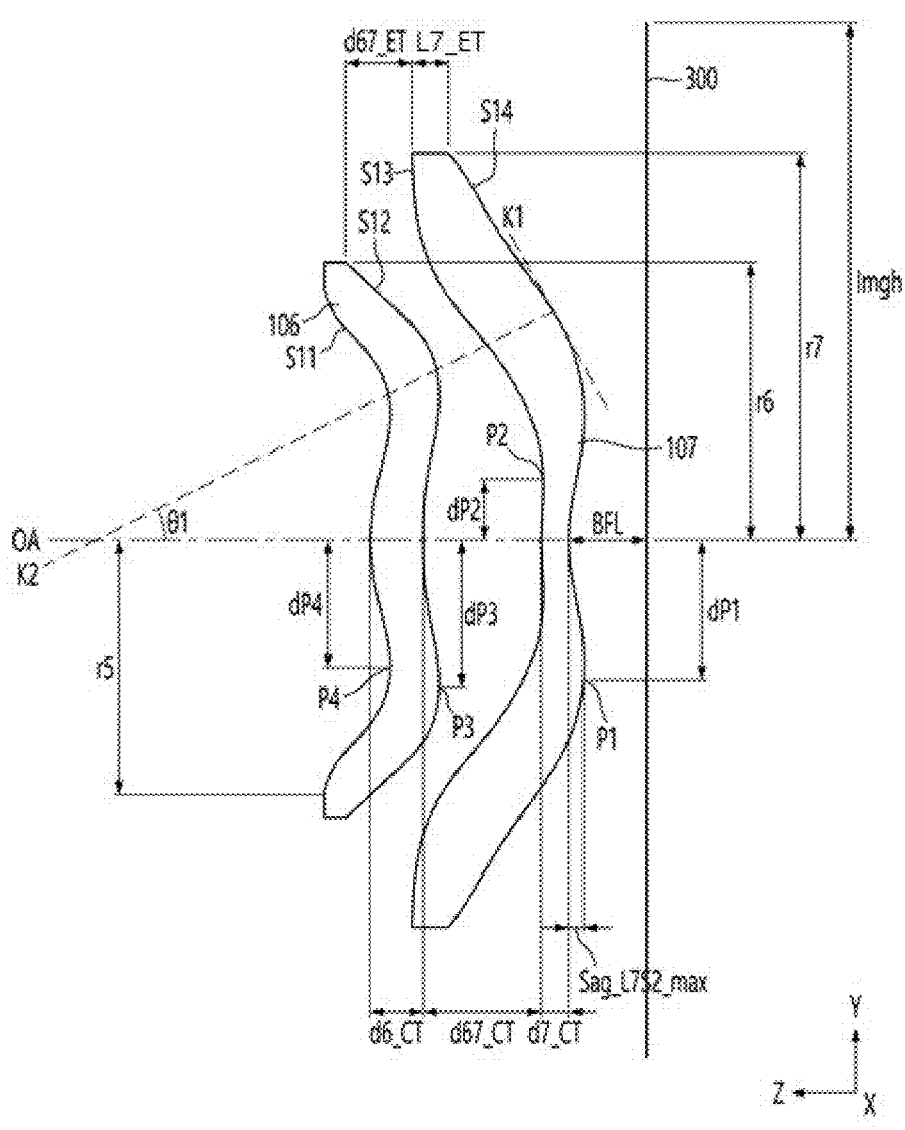
FIG. 2 is an explanatory diagram illustrating a relationship among an image sensor, an n-th lens, and an n–1-th lens in the optical system of FIG. 1.
Figure 5:
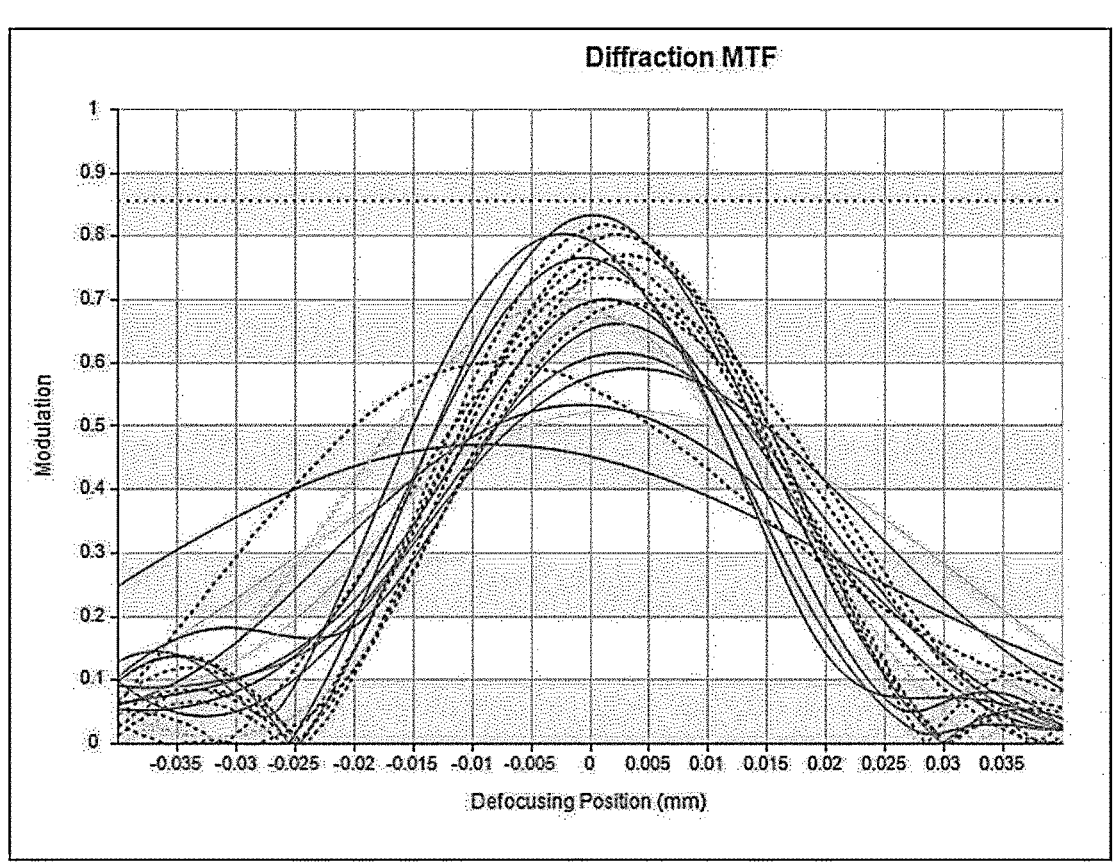
FIG. 5 is a graph of diffraction MTF of the optical system of FIG. 1.
Figure 6:
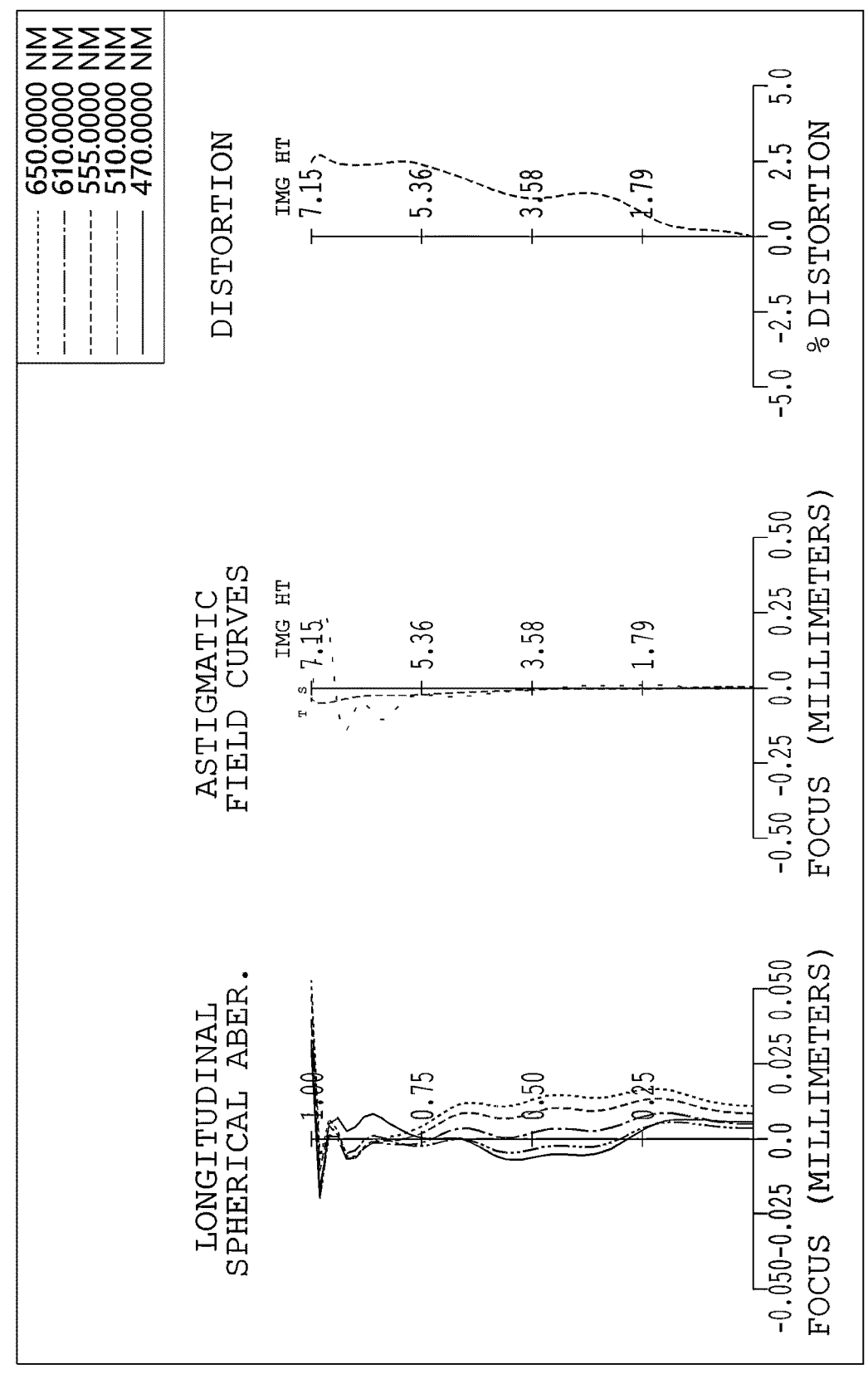
FIG. 6 is a graph showing aberration characteristics of the optical system of FIG. 1.

FIG. 1 is a configuration diagram of an optical system according to an embodiment, FIG. 2 is a view for explaining the center thickness, the edge thickness, and the distances between lenses in the optical system of FIG. 1, FIG. 3 is data on the aspherical surface coefficient of each lens surface in the optical system of FIG. 1, FIG. 4 is data on distances between two adjacent lenses in the optical system of FIG. 1, FIG. 5 is a graph of diffraction MTF of the optical system of FIG. 1, and FIG. 6 is a graph showing aberration characteristics of the optical system of FIG. 1.

Referring to FIG. 1, an optical system 1000 according to an embodiment may include a plurality of lens groups. In detail, each of the plurality of lens groups includes at least one lens. For example, the optical system 1000 may include a first lens group G1 and a second lens group G2 sequentially disposed along the optical axis OA from the object side toward the image sensor 300. The first lens group G1 may include at least one lens. The first lens group G1 may include three or less lenses. For example, the first lens group G1 may include three lenses. The second lens group G2 may include at least one lens. The second lens group G2 may include a larger number of lenses than that of the lenses of the first lens group G1. The second lens group G2 may include six lenses or less. The number of lenses of the second lens group G2 may have a difference of one or more and two or less compared to the number of lenses of the first lens group G1. For example, the second lens group G2 may include four lenses.

Hereinafter, the optical characteristics of the first lens group G1 and the second lens group G2 will be described in detail.

The first lens group G1 may have positive (+) refractive power. The second lens group G2 may have a different negative (−) refractive power than that of the first lens group G1. The first lens group G1 and the second lens group G2 may have different focal lengths. As the first lens group G1 and the second lens group G2 have refractive powers opposite to each other, the focal length f_G2 of the second lens group G2 has a negative (−) sign, and the focal length f_G1 of the first lens group G1 may have a positive (+) sign.

When expressed as an absolute value, the focal length of the first lens group G1 may be greater than that of the second lens group G2. For example, the absolute value of the focal length f_G1 of the first lens group G1 may be 1.1 times or more, for example, in a range of 1.1 to 1.6 times the absolute value of the focal length f_G2 of the second lens group G2. Accordingly, the optical system 1000 according to the embodiment may have improved aberration control characteristics such as chromatic aberration and distortion aberration by controlling the refractive power and focal length of each lens group, and may have good optical performance on the center and periphery portions of the FOV.

The first lens group G1 and the second lens group G2 may have a set distance on the optical axis. The distance between the first lens group G1 and the second lens group G2 on the optical axis is a distance on the optical axis, and may be a distance between a sensor-side surface of the lens closest to the sensor side among the lenses in the first lens group G1 and an object-side surface of the lens closest to the object side among the lenses in the second lens group G2 on the optical axis. The distance on the optical axis between the first lens group G1 and the second lens group G2 may be greater than the center thickness of each lens of the first lens group G1, and may be 50% or less of the distance on the optical axis in the first lens group G1, for example, in the range of 30% to 50%. The distance on the optical axis between the first lens group G1 and the second lens group G2 may be greater than the center thickness of the thickest lens in the lenses of the first lens group G1. Here, the distance on the optical axis in the first lens group G1 is the optical axis distance between the object-side surface of the lens closest to the object side of the first lens group G1 and the sensor-side surface of the lens closest to the sensor side.

The distance on the optical axis between the first lens group G1 and the second lens group G2 may be 20% or less of the distance on the optical axis of the second lens group G2, for example, in a range of 11% to 20%. The distance on the optical axis of the second lens group G2 is the optical axis distance between the object-side surface of the lens closest to the object side of the second lens group G2 and the sensor-side surface of the lens closest to the sensor side. Accordingly, the optical system 1000 may have good optical performance not only at the center portion of the field of view (FOV) but also at the periphery portion, and may improve chromatic aberration and distortion aberration.

The optical system 1000 may include the first lens group G1 and the second lens group G2 sequentially arranged from the object side toward the image sensor 300. The optical system 1000 may include eight lenses or less. The first lens group G1 refracts light incident through the object side to collect them, and the second lens group G2 may refract light emitted through the first lens group G1 so as to diffuse to the periphery of the image sensor 300.

In the first lens group G1, the number of lenses having positive (+) refractive power may be more than that of lenses having negative (−) refractive power. In the second lens group G2, the number of lenses having positive (+) refractive power and lenses having negative (−) refractive power may be the same.

The lens surface (e.g., S6) of the first lens group G1 and the lens surface (e.g., S7) of the second lens group G2 facing each other may have a concave shape on the optical axis. Among the distances between the lenses of the first and second lens groups G1 and G2, the optical axis distance between the first and second lens groups G1 and G2 may have the largest distance when the maximum distance on the optical axis between the lenses of the second lens group G2 is excluded. A sum of convex surfaces on the object side and concave surfaces on the sensor side on the optical axis OA or paraxial region of each lens of the first lens group G1 may be 80% or more in the first lens group G1. The sum of concave surfaces on the object side and convex surfaces on the sensor side on the optical axis OA or paraxial region of each lens of the second lens group G2 may be 55% or more of that of the second lens group G2. For example, the optical system 1000 may include a first lens 101, a second lens 102, a third lens 103, a fourth lens 104, a fifth lens 105, a sixth lens 106, and a seventh lens 107. The first to seventh lenses 101, 102, 103, 104, 105, 106, and 107 may be sequentially disposed along the optical axis OA of the optical system 1000.

The light corresponding to an information of the object may pass through the first lens 101, the second lens 102, the third lens 103, the fourth lens 104, the fifth lens 105, the sixth lens 106, and the seventh lens 107, and may be incident on the image sensor 300. Each of the plurality of lenses 101, 102, 103, 104, 105, 106, and 107 may include an effective region and an ineffective region. The effective region may be an area through which light incident on each of the lenses 101, 102, 103, 104, 105, 106, and 107 passes. That is, the effective region may be an effective region in which the incident light is refracted to realize optical characteristics. The ineffective region may be arranged around the effective region. The ineffective region may be a region in which effective light is not incident from the plurality of lenses 101, 102, 103, 104, 105, 106, and 107. That is, the ineffective region may be a region unrelated to the optical characteristics. Also, an end of the ineffective may be a region fixed to a barrel (not shown) receiving the lenses.

The optical system 1000 may include an image sensor 300. The image sensor 300 may detect light and convert it into an electrical signal. The image sensor 300 may sense light sequentially passing through the plurality of lenses 101 to 107. The image sensor 300 may include a device capable of sensing incident light, such as a charge coupled device (CCD) or a complementary metal oxide semiconductor (CMOS). The optical system 1000 may include a filter 500. The filter 500 may be disposed between the second lens group G2 and the image sensor 300.

The filter 500 may be disposed between a lens closest to a sensor side among the plurality of lenses 101 to 107 and the image sensor 300. For example, when the optical system 100 may have a seven lens, the filter 500 may be disposed between the seventh lens 107 and the image sensor 300. The filter 500 may include at least one of an infrared filter and an optical filter of a cover glass. The filter 500 may pass light of a set wavelength band and filter light of a different wavelength band. When the filter 500 includes an infrared filter, radiant heat emitted from external light may be blocked from being transferred to the image sensor 300. In addition, the filter 500 may transmit visible light and reflect infrared light.

The optical system 1000 according to the embodiment may include an aperture stop (not shown). The aperture stop may control the amount of light incident to the optical system 1000. The aperture stop may be disposed at a set position. For example, the aperture stop may be disposed around an object-side surface or a sensor-side surface of the lens closest to the object side. The aperture stop may be disposed between two adjacent lenses among the lenses in the first lens group G1. For example, the aperture stop may be located between the first lens 101 and the second lens 102. Alternatively, at least one lens selected from among the plurality of lenses 101 to 107 may serve as an aperture stop. In detail, an object-side surface or a sensor-side surface of one lens selected from among the lenses 101, 102, and 103 of the first lens group G1 may serve as an aperture stop for adjusting the amount of light. For example, the sensor-side surface S2 of the first lens 101 or the object-side surface S3 of the second lens 102 may serve as an aperture stop.

The optical system 1000 according to an embodiment of the invention may include the first lens 101 to the seventh lens 107. The first lens 101 is the closest lens to the object side in the first lens group G1. The first lens 101 may have positive (+) or negative (−) refractive power on the optical axis OA. The first lens 101 may have positive (+) refractive power. The first lens 101 may include a plastic or glass material. Preferably, the first lens 101 may be made of a plastic material. The first lens 101 may include a first surface S1 defined as an object-side surface and a second surface S2 defined as a sensor-side surface. The first lens 101 may have a meniscus shape convex toward the object side. In other words, the first surface S1 may have a convex shape on the optical axis OA or paraxial region, and the second surface S2 may have a concave shape on the optical axis OA or paraxial region. Alternatively, among the first and second surfaces S1 and S2, the second surface S2 may have a convex shape on the optical axis OA or paraxial region. That is, the first lens 101 may have a convex shape on both sides in the optical axis OA or paraxial region. At least one or both of the first surface S1 and the second surface S2 may be aspheric.

The second lens 102 may be disposed between the first lens 101 and the third lens 103. The second lens 102 may have positive (+) or negative (−) refractive power on the optical axis OA. The second lens 102 may have positive (+) refractive power. The second lens 102 may include a plastic or glass material. For example, the second lens 102 may be made of a plastic material. The second lens 102 may include a third surface S3 defined as an object-side surface and a fourth surface S4 defined as a sensor-side surface. The second lens 102 may have a biconvex shape on the optical axis OA or paraxial region. In other words, the third surface S3 may have a convex shape on the optical axis OA or paraxial region, and the fourth surface S4 may have a convex shape on the optical axis OA or paraxial region. Alternatively, among the third and fourth surfaces S3 and S4, the fourth surface S3 may have a concave shape on the optical axis OA or paraxial region. At least one or both of the third surface S3 and the fourth surface S4 may be aspheric.

The third lens 103 is the closest lens to the sensor side in the first lens group G1. The third lens 103 may have positive (+) or negative (−) refractive power on the optical axis OA. The third lens 103 may have negative (−) refractive power. The third lens 103 may include a plastic or glass material. For example, the third lens 103 may be made of a plastic material. The third lens 103 may include a fifth surface S5 defined as an object-side surface and a sixth surface S6 defined as a sensor-side surface. The third lens 103 may have a meniscus shape convex from the optical axis OA toward the object side. In other words, the fifth surface S5 may have a convex shape on the optical axis OA or paraxial region, and the sixth surface S6 may have a concave shape on the optical axis OA or paraxial region. Alternatively, among the fifth and sixth surfaces S5 and S6, the fifth surface S5 may have a concave shape on the optical axis OA. That is, the third lens 103 may have a concave shape on both sides in the optical axis OA or paraxial region. At least one or both of the fifth surface S5 and the sixth surface S6 may be aspherical.

Among the first to third lenses 101, 102, and 103, the absolute value of the focal length of the second lens 102 may be the largest. The absolute value of the focal length of the first lens group G1 may have a large value in the order of the first lens 101, the second lens 102, and the third lens 103. The first to third lenses 101, 102, and 103 may have different center thicknesses (CT). In detail, among the first to third lenses 101, 102, and 103, the first lens 101 may have the thickest center thickness, and the third lens 103 may have the thinnest center thickness. Among the first to third lenses 101, 102, and 103, the third lens 103 may have the largest refractive index, and the refractive index of the first lens 101 may be equal to the refractive index of the second lens 102. The refractive index of the third lens 103 may be greater than 1.6, and the refractive index of the first and second lenses 101 and 102 may be less than 1.6.

The Abbe number of the third lens 103 may be the smallest among the first to third lenses 101, 102, and 103, and the Abbe number of the second lens 102 may be equal to the Abbe number of the first lens 101. In this case, the Abbe number of the third lens 103 may be 20 or more smaller than the Abbe number of the second lens 102. In detail, the Abbe number of the third lens 103 may be 30 or more smaller than the Abbe number of the second lens 102, and may be, for example, in the range of 10 to 25.

Among the first to third lenses 101, 102, and 103, at least one of the object-side surface and the sensor-side surface of the third lens 103 may have the smallest effective diameter (e.g., clear aperture), and, at least one of the object-side surface and the sensor-side surface of the first lens 101 may have the largest effective diameter. In detail, the effective diameter of the sensor-side sixth surface S6 of the third lens 103 may be the smallest among the first to sixth surfaces S1, S2, S3, S4, S5, and S6. At this time, the size of the effective diameter of the sensor-side sixth surface S6 of the third lens 103 may be the smallest of the sensor-side surfaces and the object-side surfaces of the first to seventh lenses 101, 102, 103, 104, 105, 106, and 107. Accordingly, the optical system 1000 may improve resolving power and chromatic aberration control characteristics by controlling incident light, and may improve vignetting characteristics of the optical system 1000.

The fourth lens 104 may have positive (+) or negative (−) refractive power on the optical axis OA. The fourth lens 104 may have positive refractive power. The fourth lens 104 may include a plastic or glass material. For example, the fourth lens 104 may be made of a plastic material. The fourth lens 104 may include a seventh surface S7 defined as an object-side surface and an eighth surface S8 defined as a sensor-side surface. The fourth lens 104 may have a meniscus shape convex toward the sensor. In other words, the seventh surface S7 may have a concave shape on the optical axis OA or paraxial region, and the eighth surface S8 may have a convex shape on the optical axis OA or paraxial region. Alternatively, the fourth lens 104 may have a meniscus shape convex toward the object side. In other words, the seventh surface S7 may have a convex shape on the optical axis OA or paraxial region, and the eighth surface S8 may have a concave shape on the optical axis OA or paraxial region. Alternatively, the fourth lens 104 may have a concave shape on the seventh and eighth surfaces S7 and S8 or a convex shape on the seventh and eighth surfaces S7 and S8 in the optical axis OA or paraxial region. At least one of the seventh surface S7 and the eighth surface S8 may be an aspherical surface. For example, both the seventh surface S7 and the eighth surface S8 may be aspheric surfaces.

The fifth lens 105 may have positive (+) or negative (−) refractive power on the optical axis OA. The fifth lens 105 may have negative (−) refractive power. The fifth lens 105 may include a plastic or glass material. For example, the fifth lens 105 may be made of a plastic material. The fifth lens 105 may include a ninth surface S9 defined as an object-side surface and a tenth surface S10 defined as a sensor-side surface. Both sides of the fifth lens 105 may have a concave shape. The ninth surface S9 may have a concave shape on the optical axis OA or paraxial region, and the tenth surface S10 may have a concave shape on the optical axis OA or paraxial region. Alternatively, the fifth lens 105 may have a meniscus shape convex toward the object side. In other words, the ninth surface S9 may have a convex shape on the optical axis OA or paraxial region, and the tenth surface S10 may have a concave shape on the optical axis OA or paraxial region. Alternatively, the fifth lens 105 may have a shape in which the ninth and tenth surfaces S9 and S10 are concave, or the ninth and tenth surfaces S9 and S10 are convex on the optical axis OA or paraxial region. At least one of the ninth surface S9 and the tenth surface S10 may be an aspherical surface. For example, both the ninth surface S9 and the tenth surface S10 may be aspheric surfaces.

The sixth lens 106 may have positive (+) or negative (−) refractive power along the optical axis OA. The sixth lens 106 may have positive (+) refractive power. The sixth lens 106 may include a plastic or glass material. For example, the sixth lens 106 may be made of a plastic material. The sixth lens 106 may include an eleventh surface S11 defined as an object-side surface and a twelfth surface S12 defined as a sensor-side surface. The sixth lens 106 may have a meniscus shape convex toward the object in the optical axis OA or paraxial region. The eleventh surface S11 may have a convex shape on the optical axis OA or paraxial region, and the twelfth surface S12 may have a concave shape on the optical axis OA or paraxial region. Alternatively, the eleventh surface S11 may have a convex shape on the optical axis OA or paraxial region, and the twelfth surface S12 may have a convex shape on the optical axis OA or paraxial region. That is, the sixth lens 106 may have a biconvex shape on the optical axis OA or paraxial region. At least one of the eleventh surface S11 and the twelfth surface S12 may be an aspheric surface. For example, both the eleventh surface S11 and the twelfth surface S12 may be aspherical surfaces.

The seventh lens 107 may have positive (+) or negative (−) refractive power on the optical axis OA. The seventh lens 107 may have negative (−) refractive power. The seventh lens 107 may include a plastic or glass material. For example, the seventh lens 107 may be made of a plastic material. The seventh lens 107 may include a thirteenth surface S13 defined as an object-side surface and a fourteenth surface S14 defined as a sensor-side surface. The seventh lens 107 may have a meniscus shape convex toward the object side. The thirteenth surface S13 may have a convex shape on the optical axis OA or paraxial region, and the fourteenth surface S14 may have a concave shape on the optical axis OA or paraxial region. That is, differently, the thirteenth surface S13 may have a convex shape on the optical axis OA or paraxial region, and the fourteenth surface S14 may have a convex shape on the optical axis OA or paraxial region. That is, the seventh lens 107 may have a convex shape on both sides in the optical axis OA or paraxial region. At least one of the thirteenth surface S13 and the fourteenth surface S14 may be an aspherical surface. For example, both the thirteenth surface S13 and the fourteenth surface S14 may be aspheric surfaces.

Among the fourth to seventh lenses 104, 105, 106, and 107, at least one of the object-side surface and the sensor-side surface of the fourth lens 104 may have the smallest effective diameter (e.g., clear aperture), and at least one of the object-side surface and the sensor-side surface of the seventh lens 107 may be the largest effective diameter. In detail, the size of the effective diameter of the seventh object-side surface S7 of the fourth lens 104 may be the smallest among the object-side surfaces and the sensor-side surfaces of the fourth to seventh lenses 104, 105, 106, and 107. The size of the effective diameter of the sensor-side fourteenth surface S14 of the seventh lens 107 may be the largest of the object-side surfaces and the sensor-side surfaces of the first to seventh lenses 101, 102, 103, 104, 105, 106, and 107. The size of the effective diameter of the sensor-side fourteenth surface S14 of the seventh lens 107 may be greater than 1 time and smaller than 5 times the size of the effective diameter of the sixth surface S6 of the third lens 103. Accordingly, the optical system 1000 may improve chromatic aberration reduction and vignetting characteristics.

When the size of the effective diameter of each of the first to seventh lenses 101, 102, 103, 104, 105, 106, and 107 is defined as the average value of the effective diameter of the object-side surface and the sensor-side surface of each lens, The average effective diameter of the fifth and sixth surfaces S5 and S6 of the three lenses 103, that is, the size of the effective diameter of the third lens 103 may be the smallest among the lenses. In addition, the average effective diameter of the thirteenth and fourteenth surfaces S13 and S14 of the seventh lens 107, that is, the size of the effective diameter of the seventh lens 107 may be the largest among the lenses. The size of the effective diameter of the seventh lens 107 may be more than twice the size of the effective diameter of the third lens 103, for example, greater than 2 times and less than 4 times.

At least one of the fourth to seventh lenses 104, 105, 106, and 107 may have a refractive index greater than 1.6. Among the fourth to seventh lenses 104, 105, 106, and 107, the fifth lens 105 may have the largest refractive index and may be greater than the refractive indices of the fourth, sixth, and seventh lenses 104, 106, and 107. The refractive indices of the fourth, sixth, and seventh lenses 104, 106, and 107 may be less than 1.6. The number of lenses having a refractive index greater than 1.6 in the optical system 1000 may be 30% or less of the total number of lenses or may be 2 or less of the total number of lenses.

The number of lenses having at least one critical point among the first lenses 101 to the seventh lenses 107 may be 25% or more, for example, in the range of 25% to 35%. The sum of the surfaces having the critical point among the first to fourteenth surfaces S1 to S14 may be 25% or more, for example, in the range of 25% to 35%. At least one of the surface S13 and the fourteenth surface S14 may have a critical point P1. For example, each of the thirteenth and fourteenth surfaces S13 and S14 may have at least one critical point.

Referring to FIG. 2, a tangent line K1 passing through an arbitrary point on the fourteenth surface S14 of the seventh lens 107 and a normal line L2 perpendicular to the tangent line K1 may have a predetermined angle θ1 to the optical axis OA. Here, the critical point may mean a point where a slope of the normal line K2 and the optical axis OA is zero on the lens surface. In the fourteenth surface S14, the critical point may refer to a point where the slope of a virtual line extending in a direction perpendicular to the tangent line K1 and the optical axis OA is 0, and may be defined as the first critical point P1. The first critical point P1 may be a point at which a sign of a slope value in a direction perpendicular to the optical axis OA and the optical axis OA changes from positive (+) to negative (−) or negative (−) to positive (+) and may mean a point at which the slope value is 0. For example, the fourteenth surface S14 may have the first critical point P1 at a predetermined distance dP1 from the optical axis OA. The first critical point P1 may be disposed at a position less than 40% of the effective radius r7 of the fourteenth surface S14 based on the optical axis OA. The effective radius r7 is a straight-line distance from the optical axis OA to the end of the effective region of the fourteenth surface S14. In detail, the first critical point P1 may be disposed in a range of 20% to 40% of the effective radius r7 of the fourteenth surface S14 based on the optical axis OA. Here, the position of the first critical point P1 is a position set based on a direction perpendicular to the optical axis OA, and may be spaced apart by a straight-line distance dP1 from the optical axis OA to the first critical point P1.

The thirteenth surface S13 of the seventh lens 107 may include a second critical point P2 spaced apart from the optical axis OA by a predetermined distance. The second critical point P2 may be a point at which a sign of a slope value in a direction perpendicular to the optical axis OA and the optical axis OA changes from positive (+) to negative (−) or negative (−) to positive (+) and may mean a point at which the slope value is 0. For example, the second critical point P2 may be spaced apart from the optical axis OA by a predetermined second distance dP2. The second critical point P2 may be disposed at a position less than 20% of an effective radius of the thirteenth surface S13 based on the optical axis OA. In detail, the second critical point P2 may be disposed in a range of 10% to 20% of the effective radius of the thirteenth surface S13 based on the optical axis OA. The effective radius of the thirteenth surface S13 may be smaller than an effective radius r7 of the fourteenth surface S14. Here, the position of the second critical point P2 may be closer to the optical axis OA than the first critical point P1.

It is preferable that the position of the first critical point P1 disposed on the seventh lens 107 is disposed at a position that satisfies the above-described range in consideration of the optical characteristics of the optical system 1000. In detail, the position of the first critical point P1 preferably satisfies the above-described range for controlling the optical characteristics of the peripheral portion of the FOV, for example, the distortion characteristics.

At least one of the eleventh surface S11 and the twelfth surface S12 of the sixth lens 106 may have a critical point. For example, the twelfth surface S12 may have at least one third critical point. The eleventh surface S11 may have at least one fourth critical point. The third critical point P3 of the twelfth surface S12 may be spaced apart from the optical axis OA by a predetermined third distance dP3. The third distance dP3 may be greater than the first distance dP1 with respect to the optical axis OA. The third critical point P3 may be disposed at a position of 46% or more of the effective radius r6 of the twelfth surface S12, for example, in the range of 46% to 56% or 48% to 53% of the effective radius r6 of the twelfth surface S12. The fourth critical point P4 of the eleventh surface S11 may be spaced apart from the optical axis OA by a predetermined fourth distance dP4. The fourth distance dP4 may be greater than the first distance dP1 with respect to the optical axis OA. The fourth critical point P4 may be disposed at a position of 46% or more of the effective radius r5 of the eleventh surface S11, for example, in the range of 46% to 56% or 48% to 53% of the effective radius r5 of the eleventh surface S11. The fourth critical point P4 may be disposed closer to the optical axis OA than the third critical point P3, and may be disposed farther from the optical axis OA than the second critical point P2. At the third and fourth critical points P3 and P4, the sign of the slope value with respect to the optical axis OA and the direction perpendicular to the optical axis OA changes from positive (+) to negative (−) or from negative (−) to positive (+) and may mean a point where the slope value is 0.

It is preferable that the positions of the third and fourth critical points P3 and P4 disposed on the sixth lens 106 satisfy the above-described range in consideration of the optical characteristics of the optical system 1000. In detail, the positions of the third and fourth critical points P3 and P4 preferably satisfy the above-described range for controlling the optical characteristics of the periphery portion of the field of view (FOV), for example, distortion characteristics. Among the lenses of the optical system 1000, 50% or more of the lenses or 4 or more lenses may have an Abbe number in the range of 40 to 70, and 60% or more of the lenses or 5 or more lenses may have a refractive power of less than 1.6. Accordingly, the optical system 1000 may implement good optical performance in the center and periphery portions of the field of view (FOV) and have improved aberration characteristics.

As shown in FIG. 2, sag_L7S2_Max is the maximum sag value of the fourteenth surface S14 at the first critical point P1, d7_CT is the center thickness or a thickness on the optical axis in the seventh lens 107, and L7_ET is an edge thickness of the seventh lens 107. D6_CT is the center thickness or a thickness on the optical axis in the sixth lens 106, and L6_ET is the edge thickness of the sixth lens 107. The edge thickness L7_ET of the seventh lens 107 is the distance from the end of the effective region of the thirteenth surface S13 to the effective region of the fourteenth surface S14 in a direction of the optical axis.

d67_CT is a distance on the optical axis from the center of the sixth lens 106 to the center of the seventh lens 107 (i.e., center distance). That is, the optical axis distance d67_CT from the center of the sixth lens 106 to the center of the seventh lens 107 is the distance from the center of the twelfth surface S12 to the center of the thirteenth surface S13.

d67_ET is the distance from the edge of the sixth lens 106 to the edge of the seventh lens 107 in the direction of the optical axis (i.e., the edge distance). That is, the distance d67_ET from the edge of the sixth lens 106 to the edge of the seventh lens 107 in the direction of the optical axis is the distance between the straight line extending in the circumferential direction from the end of the effective region of the twelfth surface S12 and the end of the effective region of the thirteenth surface S13 in the direction of the optical axis. A back focal length (BFL) is a distance on the optical axis from the image sensor 300 to the last lens. In this way, the center thicknesses and edge thicknesses of the first to seventh lenses 101, 102, 103, 104, 106, 106, and 107, and the center distances and the edge distances between two adjacent lenses may be set. In FIG. 2, for convenience of description, the filter is not shown.

The optical system 1000 according to the embodiment may satisfy at least one of equations described below. Accordingly, the optical system 1000 according to the embodiment may have improved optical characteristics. For example, when the optical system 1000 satisfies at least one equation, the optical system 1000 may effectively control aberration characteristics such as chromatic aberration and distortion aberration, and may have good optical performance not only in the center portion of the FOV but also in the periphery portion. In addition, the optical system 1000 may have improved resolving power and may have a slimmer and more compact structure. In addition, the meaning of the thickness of the optical axis OA of the lens described in the equations, the distance of the optical axis OA of adjacent lenses, and the distance of the edge may be the same as that of FIG. 2.

$$2 < L1\_CT/L3\_CT < 4 \qquad \text{[Equation 1]}$$

In Equation 1, L1_CT means the thickness (mm) of the first lens 101 on the optical axis OA, and L3_CT means the thickness (mm) of the third lens 103 on the optical axis OA. When the optical system 1000 according to the embodiment satisfies Equation 1, the optical system 1000 may improve aberration characteristics.

$$0.5 < L3\_CT/L3\_ET < 2 \qquad \text{[Equation 2]}$$

In Equation 2, L8_CT means the thickness (mm) of the third lens 103 on the optical axis OA, and L3_ET means a thickness (mm) at the end of the effective region of the third lens 103 in the direction of the optical axis OA. In detail, L3_ET means a distance between the end of the effective region of the fifth surface S5 of the third lens 103 and the end of the effective region of the sixth surface S6 of the third lens 103 in the direction of the optical axis OA. When the optical system 1000 according to the embodiment satisfies Equation 2, the optical system 1000 may have improved chromatic aberration control characteristics.

$$1 < L7\_ET/L7\_CT < 5 \qquad \text{[Equation 3]}$$

In Equation 3, L7_CT means the thickness (mm) of the seventh lens 107 on the optical axis OA, and L7_ET means a thickness (mm) at the end of the effective region of the seventh lens 111 in the direction of the optical axis OA. In detail, L7_ET means the distance in the direction of the optical axis OA between the end of the effective region of the object-side surface (thirteenth surface S13) of the seventh lens 107 and the end of the effective region of the sensor-side surface (fourteenth surface S14) of the seventh lens 107. When the optical system 1000 according to the embodiment satisfies Equation 3, the optical system 1000 may reduce distortion and thus have improved optical performance.

$$1.6 < n3 \qquad \text{[Equaiton 4]}$$

16

In Equation 4, n3 means the refractive index of the third lens 103 at the d-line. When the optical system 1000 according to the embodiment satisfies Equation 4, the optical system 1000 may improve chromatic aberration characteristics.

$$0.5 < L7S2\_Max\_sag \text{ to Sensor} < 2 \qquad \text{[Equation 5]}$$

In Equation 5, L7S2_Max_sag to Sensor means a distance (mm) from the maximum sag value of the sensor-side fourteenth surface S14 of the seventh lens 107 to the image sensor 300 in the direction of the optical axis OA. For example, L7S2_Max_sag to Sensor means the distance (mm) from the first critical point P1 to the image sensor 300 in the direction of the optical axis OA. When the optical system 1000 according to the embodiment satisfies Equation 5, the optical system 1000 secures a space in which the filter 500 may be disposed between the plurality of lenses 100 and the image sensor 300, thereby having improving assembly. In addition, when the optical system 1000 satisfies Equation 5, the optical system 1000 may secure a gap for module manufacturing.

In the lens data for the embodiment to be described later, the position of the filter, in detail, the distance between the last lens and the filter 500, and the distance between the image sensor 300 and the filter 500 are positions set for convenience in the design of the optical system 1000, and the filter 500 may be freely disposed within a range of not contacting the two components (111 and 300), respectively. Accordingly, when the value of L7S2_Max_sag to Sensor in the lens data is smaller than or equal to the distance in the optical axis OA between the object-side surface of the filter 500 and the upper surface of the image sensor 300, BFL and L7S2_Max_sag to Sensor of the optical system 1000 do not change and are constant, and the position of the filter 500 may move within a range of not contacting the two components (111 and 300), respectively, to have good optical performance.

$$1 < BFL/L10S2\_Max\_sag \text{ to Sensor} < 2 \qquad \text{[Equation 6]}$$

In Equation 6, BFL (Back focal length) is the distance on the optical axis OA from the center of the sensor-side fourteenth surface S14 of the seventh lens 107 closest to the image sensor 300 to the upper surface of the image sensor 300. L7S2_Max_sag to sensor means a distance (mm) from the maximum sag value of the fourteenth surface S14 of the seventh lens 107 to the image sensor 300 in the direction of the optical axis. For example, L10S2_Max_sag to Sensor is the distance from the first critical point P1 to the image sensor 300 in the direction of the optical axis. When the optical system 1000 according to the embodiment satisfies Equation 6, the optical system 1000 may improve distortion characteristics and may have good optical performance in the periphery of the field of view (FOV).

$$5 < |L7S2\_Max \text{ slope}| < 45 \qquad \text{[Equation 7]}$$

In Equation 7, L7S2_Max slope means the maximum value (Degree) of the tangential angle measured on the sensor-side fourteenth surface S14 of the seventh lens 107.

In detail, in the fourteenth surface S14, L10S2_Max slope means an angle value (Degree) of a point having the largest tangential angle with respect to a virtual line extending in a direction perpendicular to the optical axis OA. When the optical system 1000 according to the embodiment satisfies Equation 7, the optical system 1000 may control the occurrence of lens flare.

$$0.2 < L7S2 \text{ Inflection Point} < 0.6 \qquad \text{[Equation 8]}$$

In Equation 8, L7S2 Inflection Point may mean the position of the first critical point P1 located on the sensor-side fourteenth surface S14 of the seventh lens 107. In detail, L7S2 Inflection Point may mean the first critical point P1 on the fourteenth surface S14 when the optical axis OA is a start point, the end of the effective region of the fourteenth surface S14 of the seventh lens 107 is an end point, and the length from the optical axis OA to the end of the effective region in the vertical direction of the optical axis OA is 1. When the optical system 1000 according to the embodiment satisfies Equation 8, the optical system 1000 may improve distortion aberration characteristics.

$$1 < d67\_CT/d67\_Min < 10 \qquad \text{[Equation 9]}$$

In Equation 9, d67_CT means the distance (mm) between the sixth and seventh lenses 106 and 107 on the optical axis OA. In detail, the d67_CT means the distance (mm) in the optical axis OA between the twelfth surface S12 of the sixth lens 106 and the thirteenth surface S13 of the seventh lens 107. d67_Min means the minimum distance (mm) among the distances between the sixth and seventh lenses 106 and 107 in the direction of the optical axis OA. When the optical system 1000 according to the embodiment satisfies Equation 9, the optical system 1000 may improve distortion aberration characteristics and may have good optical performance in the periphery portion of the field of view (FOV).

$$1 < d67\_CT/d67\_ET < 5 \qquad \text{[Equation 10]}$$

In Equation 10, the d67_CT means the distance (mm) in the optical axis between the sixth lens 106 and the seventh lens 107. In detail, d67_CT means the distance between the sensor-side surface (twelfth surface S12) of the sixth lens 106 and the object-side surface (thirteenth surface S13) of the seventh lens 107 on the optical axis OA. d67_ET means the distance between the end of the effective region of the sensor-side twelfth surface S12 of the sixth lens 106 and the end of the effective region of the object-side thirteenth surface S13 of the seventh lens 107 in the direction of the optical axis OA. When the optical system 1000 according to the embodiment satisfies Equation 10, good optical performance may be obtained even at the center periphery portions of FOV. In addition, the optical system 1000 may reduce distortion and thus have improved optical performance.

$$0.01 < d12\_CT/d67\_CT < 1 \qquad \text{[Equation 11]}$$

In Equation 11, d12_CT means a distance (mm) on the optical axis between the first lens 101 and the second lens 102. In detail, the d12_CT means the distance (mm) between the second surface S2 of the first lens 101 and the third surface S3 of the second lens 102 in the optical axis OA. d67_CT means the distance (mm) on the optical axis between the sixth lens 106 and the seventh lens 107. In detail, d67_CT means the distance (mm) from the sensor-side twelfth surface S12 of the sixth lens 106 and the object-side thirteenth surface S13 of the seventh lens 107 in the optical axis OA. When the optical system 1000 according to the embodiment satisfies Equation 11, the optical system 1000 may improve aberration characteristics, and control the size of the optical system 1000, for example, TTL (total track length) reduction.

$$1 < d67\_CT/d34\_CT < 4 \qquad \text{[Equation 11-1]}$$

In Equation 11-1, d34_CT means the distance (mm) between the third lens 103 and the fourth lens 104 in the optical axis. In detail, d34_CT means the distance (mm) of the sixth surface S6 of the third lens 103 and the seventh surface S7 of the fourth lens 104 in the optical axis OA. When the optical system 1000 according to the embodiment satisfies Equation 11-1, the optical system 1000 may improve aberration characteristics and control the size of the optical system 1000, for example, total track length (TTL) reduction.

$$1 < G2\_TD/d67\_CT < 4 \qquad \text{[Equation 11-2]}$$

In Equation 11-2, G2_TD means the distance (mm) in the optical axis between the object-side seventh surface S7 of the fourth lens 104 and the sensor-side fourteenth surface S14 of the seventh lens 107. Equation 11-2 may set a total distance in the optical axis of the second lens group G2 and the largest distance within the second lens group G2. When the optical system 1000 according to the embodiment satisfies Equation 11-2, the optical system 1000 may improve aberration characteristics and control the size of the optical system 1000, for example, total track length (TTL) reduction.

$$1 < G1\_TD/d34\_CT < 4 \qquad \text{[Equation 11-3]}$$

In Equation 11-3, G1_TD means the distance (mm) in the optical axis between the first object-side surface S1 of the first lens 101 and the sensor-side sixth surface S6 of the third lens 103. Equation 11-3 may set the total distance in the optical axis of the first lens group G1 and the distance between the first and second lens groups G1 and G2. When the optical system 1000 according to the embodiment satisfies Equation 11-3, the optical system 1000 may improve aberration characteristics and control total track length (TTL) reduction.

$$3 < CA\_L7S2/d67\_CT < 10 \qquad \text{[Equation 11-4]}$$

In Equation 11-4, CA_L7S2 is the effective diameter of the largest lens surface, and is the size of the effective diameter of the sensor-side fourteenth surface S14 of the seventh lens 107. When the optical system 1000 according to the embodiment satisfies Equation 11-4, the optical system 1000 may improve aberration characteristics and control total track length (TTL) reduction.

$$1 < L1\_CT/L7\_CT < 5 \qquad \text{[Equation 12]}$$

In Equation 12, L1_CT means the thickness (mm) of the first lens 101 on the optical axis OA, and L7_CT means the thickness (mm) of the seventh lens 107 on the optical axis OA. When the optical system 1000 according to the embodiment satisfies Equation 12, the optical system 1000 may have improved aberration characteristics. In addition, the optical system 1000 has good optical performance at a set FOV and may control a total track length (TTL).

$$1 < L6\_CT/L7\_CT < 5 \qquad \text{[Equation 13]}$$

In Equation 13, L6_CT means the thickness (mm) of the sixth lens 106 on the optical axis OA, and L7_CT means the thickness (mm) of the seventh lens 107 on the optical axis OA. When the optical system 1000 according to the embodiment satisfies Equation 13, the optical system 1000 may alleviate manufacturing accuracy of the sixth and seventh lenses 106 and 107 and may improve optical performance of the center and periphery portions of the angle of view FOV.

$$L1\_CT < d34\_CT < L6\_CT \qquad \text{[Equation 13-1]}$$

In Equation 13-1, L1_CT means the center thickness of the thickest first lens 101 on the first lens group G1, and d34_CT means the center distance between the first and second lens groups G1 and G2 or a distance between the third and fourth lenses 103 and 104 on the optical axis, and L6_CT means the thickness of the thickest lens in the second lens group G2 and is the center thickness of the sixth lens 106 having at least one critical point. When Equation 13-1 is satisfied, optical performance may be improved.

$$1 < L1R1/L7R2 < 5 \qquad \text{[Equation 14]}$$

In Equation 14, L1R1 means the radius (mm) of curvature of the first surface S1 of the first lens 101, and L7R2 means the radius (mm) of curvature of the fourteenth surface S14 of the seventh lens 107. When the optical system 1000 according to the embodiment satisfies Equation 14, the aberration characteristics of the optical system 1000 may be improved.

$$0 < (d67\_CT - d67\_ET)/(d67\_CT) < 2 \qquad \text{[Equation 15]}$$

In Equation 15, d67_CT means the optical axis distance (mm) between the sixth and seventh lenses 106 and 107, and d67_ET means the distance (mm) between the end of the effective region of the sensor-side twelfth surface S12 of the sixth lens 106 and the ends of the effective region of the object-side thirteenth surface S13 of the seventh lens 107 in the direction of the optical axis OA. When the optical system 1000 according to the embodiment satisfies Equation 15, it is possible to reduce the occurrence of distortion and have improved optical performance. When the optical system 1000 according to an embodiment satisfies Equation 15, the optical system 1000 may alleviate manufacturing accuracy of the sixth and seventh lenses 106 and 107 and may improve optical performance of the center and periphery portions of the FOV.

$$1 < CA\_L1S1/CA\_L3S1 < 1.5 \qquad \text{[Equation 16]}$$

In Equation 16, CA_L1S1 means the size (mm) of the effective diameter (CA: clear aperture) (H1 in FIG. 1) of the first surface S1 of the first lens 101, and CA_L3S1 means the size (mm) of the effective diameter (CA, H3 in FIG. 1) of the fifth surface S5 of the third lens 103. When the optical system 1000 according to the embodiment satisfies Equation 16, the optical system 1000 may control light incident to the first lens group G1 and may have improved aberration control characteristics.

$$1 < CA\_L7S2/CA\_L4S2 < 5 \qquad \text{[Equation 17]}$$

In Equation 17, CA_LAS2 means the size (mm) of the effective diameter (CA) of the eighth surface S8 of the fourth lens 104, and CA_L7S2 means the size (mm) of the effective diameter (CA) of the fourteenth surface S14 of the seventh lens 107. When the optical system 1000 according to the embodiment satisfies Equation 17, the optical system 1000 may control light incident to the second lens group G2 and may improve aberration characteristics.

$$0.21 < CA\_L3S2/CA\_L4S1 < 1 \qquad \text{[Equation 18]}$$

In Equation 18, CA_L3S2 means the size (mm) of the effective diameter (CA) of the sixth surface S6 of the third lens 103, and CA_L4S1 means the size (mm) of the effective diameter (CA) of the seventh surface S7 of the fourth lens 104. When the optical system 1000 according to the embodiment satisfies Equation 18, the optical system 1000 may improve chromatic aberration and control vignetting for optical performance.

$$0.1 < CA\_L5S2/CA\_L7S2 < 1 \qquad \text{[Equation 19]}$$

In Equation 19, CA_L5S2 means the size (mm) of the effective diameter (CA) of the tenth surface S10 of the fifth lens 105, and CA_L7S2 means the size (mm) of the effective diameter (CA, H7 in FIG. 1) of the fourteenth surface S14 of the seventh lens 107. When the optical system 1000 according to the embodiment satisfies Equation 19, the optical system 1000 may improve chromatic aberration.

$$1 < d34\_CT/d34\_ET < 8 \qquad \text{[Equation 20]}$$

In Equation 8, d34_CT means the distance (mm) between the third lens 103 and the fourth lens 104 on the optical axis OA. In detail, d34_CT means the distance (mm) between the sixth surface S6 of the third lens 103 and the seventh surface S7 of the fourth lens 104 in the optical axis OA. d34_ET means the distance (mm) between the end of the effective region of the sixth surface S6 of the third lens 103 and the end of the effective region of the seventh surface S7 of the fourth lens 104 in the direction of the optical axis OA. When the optical system 1000 according to the embodiment satisfies Equation 20, the optical system 1000 may reduce chromatic aberration, improve aberration characteristics, and control vignetting for optical performance.

$$1 < d67\_CT/d67\_ET < 3 \qquad \text{[Equation 21]}$$

In Equation 21, d910_CT means the distance (mm) between the sixth and seventh lenses 106 and 107 in the optical axis OA. In detail, d67_CT means the distance (mm) of the twelfth surface S12 of the sixth lens 109 and the thirteenth surface S13 of the seventh lens 107 in the optical axis OA. d67_ET means the distance (mm) between the end of the effective region of the twelfth surface S12 of the sixth lens 106 and the end of the effective region of the thirteenth surface S13 of the seventh lens 107 in the direction of the optical axis OA. When the optical system 1000 according to the embodiment satisfies Equation 21, good optical performance may be obtained even at the center and the periphery portions of the FOV, and distortion may be suppressed.

$$0 < d67\_Max/d67\_CT < 2 \qquad \text{[Equation 22]}$$

In Equation 22, d67_Max means the maximum distance among the distances (mm) between the sixth and seventh lenses 106 and 107. In detail, d67_Max means the maximum distance between the twelfth surface S12 of the sixth lens 109 and the thirteenth surface S13 of the seventh lens 107. When the optical system 1000 according to the embodiment satisfies Equation 22, optical performance may be improved in the periphery portion of the field of view (FOV), and distortion of aberration characteristics may be suppressed.

$$1 < L5\_CT/d56\_CT < 2 \qquad \text{[Equation 23]}$$

In Equation 23, L5_CT means the thickness (mm) of the fifth lens 105 on the optical axis OA, and d56_CT means the distance (mm) between the fifth and sixth lenses 105 and 106 on the optical axis OA. When the optical system 1000 according to the embodiment satisfies Equation 23, the optical system 1000 may reduce the size of the effective diameter of the fifth lens 105 and the central distance between the fifth and sixth lenses 105 and 106. And, it is possible to improve the optical performance of the periphery portion of the FOV.

$$0.1 < L6\_CT/d67\_CT < 1 \qquad \text{[Equation 24]}$$

In Equation 24, L6_CT means the thickness (mm) of the sixth lens 106 on the optical axis OA, and d67_CT means the distance (mm) between the sixth and seventh lenses 106 and 107 on the optical axis OA. When the optical system 1000 according to the embodiment satisfies Equation 24, the optical system 1000 may reduce the size of the effective diameter of the sixth lens 106 and the central distance between the sixth and seventh lenses 106 and 107. And, it is possible to improve the optical performance of the periphery portion of the FOV.

$$0.01 < L7\_CT/d67\_CT < 1 \qquad \text{[Equation 25]}$$

In Equation 25, L7_CT means the thickness (mm) of the seventh lens 107 on the optical axis OA, and d67_CT mean the distance (mm) between the sixth and seventh lenses 106 and 107 on the optical axis OA. When the optical system 1000 according to the embodiment satisfies Equation 25, the optical system 1000 may reduce the size of the effective diameter of the seventh lens 107 and the central distance between the sixth and seventh lenses 106 and 107. And, it is possible to improve the optical performance of the periphery portion of the FOV.

$$1 < |L5R1/L5\_CT| < 100 \qquad \text{[Equation 26]}$$

In Equation 26, L5R1 means the radius (mm) of curvature of the ninth surface S9 of the fifth lens 105, and L5_CT means the thickness (mm) of the fifth lens 105 on the optical axis. When the optical system 1000 according to the embodiment satisfies Equation 26, the optical system 1000 may control the refractive power of the fifth lens 105 and improve the optical performance of light incident to the second lens group G2.

$$1 < |L5R1/L7R1| < 5 \qquad \text{[Equation 27]}$$

In Equation 27, L7R1 means the radius (mm) of curvature of the thirteenth surface S13 of the seventh lens 107. When the optical system 1000 according to the embodiment satisfies Equation 27, the optical performance may be improved by controlling the shape and refractive power of the fifth and seventh lenses 105 and 107, and the optical performance of the second lens group G2 may be improved.

$$0 < L\_CT\_Max/Air\_Max < 2 \qquad \text{[Equation 28]}$$

In Equation 28, L_CT_Max means the thickest thickness (mm) in the optical axis (OA) of each of the plurality of lenses, and Air_Max means the maximum value of the air gaps or distances (mm) between the plurality of lenses. When the optical system 1000 according to the embodiment satisfies Equation 28, the optical system 1000 has good optical performance at the set FOV and focal length, and may reduce the size of the optical system 1000, for example, TTL.

$$0.5 < \sum L\_CT/\sum Air\_CT < 2 \qquad \text{[Equation 29]}$$

In Equation 29, ΣL_CT means the sum of the thicknesses (mm) in the optical axis OA of each of the plurality of lenses, and ΣAir_CT means the sum of the distances (mm) in the optical axis OA between two adjacent lenses in the plurality of lenses. When the optical system 1000 according to the embodiment satisfies Equation 29, the optical system 1000 has good optical performance at the set FOV and focal length, and may reduce the size of the optical system 1000, for example, TTL.

$$10 < \sum \text{Index} < 30 \qquad \text{[Equation 30]}$$

In Equation 30, ΣIndex means the sum of refractive indices of each of the first to seventh lenses 101, 102, 103, 104, 105, 106, and 107 at d-line. When the optical system 1000 according to the embodiment satisfies Equation 30, TTL of the optical system 1000 may be controlled, and resolution may be improved.

$$10 < \sum Abb / \sum \text{Index} < 50 \qquad \text{[Equation 31]}$$

In Equation 31, ΣAbbe means the sum of Abbe numbers of each of the first to seventh lenses 101, 102, 103, 104, 105, 106, and 107. When the optical system 1000 according to the embodiment satisfies Equation 31, the optical system 1000 may have improved aberration characteristics and resolution.

$$0 < |\text{Max\_distoriton}| < 5 \qquad \text{[Equation 32]}$$

In Equation 32, Max_distortion means the maximum value of distortion in a region from the center (0.0F) to the diagonal end (1.0F) based on the optical characteristics detected by the image sensor 300. When the optical system 1000 according to the embodiment satisfies Equation 32, the optical system 1000 may improve distortion characteristics.

$$0 < \text{Air\_ET\_Max/L\_CT\_Max} < 2 \qquad \text{[Equation 33]}$$

In Equation 33, L_CT_Max means the thickest thickness (mm) among the thicknesses on the optical axis OA of each of the plurality of lenses, and Air_CT_Max is the distance between an end of the effective region of the sensor-side surface of the n−1th lens and an end of the effective region of the object-side surface of the nth lens facing each other as shown in FIG. 2, and means, for example, the maximum value (Air_Edge_Max) among the edge distances between the two lenses. That is, it means the largest value among d (n−1, n)_ET values in lens data to be described later (where n is a natural number greater than 1 and less than or equal to 7). When the optical system 1000 according to the embodiment satisfies Equation 33, the optical system 1000 has a set FOV and focal length, and may have good optical performance in the periphery portion of the FOV.

$$0.5 < \text{CA\_L1S1/CA\_min} < 2 \qquad \text{[Equation 34]}$$

In Equation 34, CA_L1S1 means the effective diameter (mm) of the first surface S1 of the first lens 101, and CA_Min means the smallest effective diameter (mm) of the effective diameters of the first to fourteenth surfaces S1-S14. When the optical system 1000 according to the embodiment satisfies Equation 34, it is possible to control light incident through the first lens 101 and provide a slim optical system while maintaining optical performance.

$$1 < \text{CA\_Max/CA\_Min} < 5 \text{ or } 2 \leq \text{CA\_Max/CA\_Min} < 5 \qquad \text{[Equation 35]}$$

In Equation 35, CA_Max means the largest effective diameter (mm) among the object-side and sensor-side surfaces of the plurality of lenses, and means the largest effective diameter among the effective diameters (mm) of the first to fourteenth surfaces S1-S14. When the optical system 1000 according to the embodiment satisfies Equation 35, the optical system 1000 may provide a slim and compact optical system while maintaining optical performance.

$$1 < \text{CA\_L7S2/CA\_L3S2} < 5 \text{ or} \qquad \text{[Equation 35-1]}$$
$$2 \leq \text{CA\_L7S2/CA\_L3S2} < 5$$

In Equation 35, CA_L7S2 represents the effective diameter (mm) of the fourteenth surface S14 of the seventh lens 107, and has the largest effective diameter among the lenses. CA_L3S2 means an effective diameter (mm) of the sixth surface S6 of the third lens 103, and has an effective diameter of the smallest lens surface among lenses. That is, the difference between the last lens surface of the first lens group G1 and the last lens surface of the second lens group G2 may be the largest. When the optical system 1000 according to the embodiment satisfies Equation 35-1, the optical system 1000 may provide a slim and compact optical system while maintaining optical performance.

$$2 \leq \text{AVR\_CA\_L7/AVR\_CA\_L3} < 4 \qquad \text{[Equation 35-2]}$$

In Equation 35, AVR_CA_L7 represents the average value of the effective diameters (mm) of the thirteenth and fourteenth surfaces S13 and S14 of the seventh lens 107, and is the average of the effective diameters of the two largest lens surfaces among the lenses. AVR_CA_L3 represents the average value of effective diameters (mm) of the fifth and sixth surfaces S5 and S6 of the third lens 103, and represents the average of the effective diameters of the two smallest lens surfaces among the lenses. That is, the difference between the average effective diameter of the object-side and sensor-side surfaces S5 and S6 of the last lens L1 of the first lens group G1 and the average effective diameter of the object-side and sensor-side surfaces S13 and s14 of the last lens L7 of the second lens group G2 may be the largest. When the optical system 1000 according to the embodiment satisfies Equation 35-2, the optical system 1000 may provide a slim and compact optical system while maintaining optical performance.

Using Equations 35, 35-1, and 35-2, the effective diameter CA_L7S1 of the thirteenth surface S13 of the seventh lens 107 may be twice or more than the minimum effective diameter CA_Min, The effective diameter CA_L7S2 of the fourteenth surface S14 may be twice or more than the minimum effective diameter CA_Min. That is, the following equation may be satisfied.

$$2 \leq CA\_L7S1/CA\_Min < 5 \quad \text{(Equation 35-3)}$$

$$2 \leq CA\_L7C2/CA\_Min < 5 \quad \text{(Equation 35-4)}$$

Using Equations 35 and 35-1 to 35-4, the effective diameter CA_L7S2 of the thirteenth surface S13 of the seventh lens 107 may be twice or more than the average effective diameter AVR_CA_L3 of the third lens 103, and may be, for example, in the range of 2 to 4 times, and the effective diameter CA_L7S2 of the fourteenth surface S14 may be more than twice the average effective diameter AVR_CA_L3 of the third lens 103. And, for example, it may be in the range of 2 times or more and less than 5 times.

The following equation may be satisfied.

$$2 \leq CA\_L7S1/AVR\_CA\_L3 \leq 4 \quad \text{(Equation 35-5)}$$

$$2 \leq CA\_L7S2/ACR\_CA\_L3 < 5 \quad \text{(Equation 35-6)}$$

$$1 < CA\_Max/CA\_Aver < 3 \quad \text{[Equation 36]}$$

In Equation 36, CA_Max means the largest effective diameter (mm) among the object-side and sensor-side surfaces of the plurality of lenses, and CA_Aver means the average of the effective diameters of the object-side and sensor-side surfaces of the plurality of lenses. When the optical system 1000 according to the embodiment satisfies Equation 36, a slim and compact optical system may be provided.

$$0.1 < CA\_Min/CA\_Aver < 1 \quad \text{[Equation 37]}$$

In Equation 37, CA_Min means the smallest effective diameter (mm) among the object-side and sensor-side surfaces of the plurality of lenses. When the optical system 1000 according to the embodiment satisfies Equation 37, a slim and compact optical system may be provided.

$$0.1 < CA\_Max/(2 * ImgH) < 1 \quad \text{[Equation 38]}$$

In Equation 38, CA_Max means the largest effective diameter among the object-side and sensor-side surfaces of the plurality of lenses, and ImgH means the distance (mm) from the center (0.0F) of the image sensor 300 overlapping the optical axis OA to the diagonal end (1.0F). That is, ImgH means ½ of the maximum diagonal length (mm) of the effective region of the image sensor 300. When the optical system 1000 according to the embodiment satisfies Equation 38, the optical system 1000 has good optical performance in the center and periphery portions of the FOV, and may provide a slim and compact optical system.

$$0.5 < TD/CA\_Max < 1.5 \quad \text{[Equation 39]}$$

In Equation 39, TD is the maximum distance (mm) in the optical axis from the object-side surface of the first lens group G1 to the sensor-side surface of the second lens group G2. For example, it is the distance from the first surface S1 of the first lens 101 to the fourteenth surface S14 of the seventh lens 107 in the optical axis OA. When the optical system 1000 according to the embodiment satisfies Equation 39, a slim and compact optical system may be provided.

$$1 < F/L7R2 < 10 \quad \text{[Equation 40]}$$

In Equation 40, F means the total focal length (mm) of the optical system 1000, and L7R2 means the radius (mm) of curvature of the fourteenth surface S14 of the seventh lens 107. When the optical system 1000 according to the embodiment satisfies Equation 40, the optical system 1000 may reduce the size of the optical system 1000, for example, TTL.

$$1 < F/L1R1 < 10 \quad \text{[Equation 41]}$$

In Equation 41, L1R1 means the radius (mm) of curvature of the first surface S1 of the first lens 101. When the optical system 1000 according to the embodiment satisfies Equation 41, the optical system 1000 may reduce the size of the optical system 1000, for example, TTL.

$$1 < EPD/L7R2 < 10 \quad \text{[Equation 42]}$$

In Equation 42, EPD means the size (mm) of the entrance pupil of the optical system 1000, and L7R2 means the radius of curvature (mm) of the fourteenth surface S14 of the seventh lens 107. When the optical system 1000 according to the embodiment satisfies Equation 42, the optical system 1000 may control overall brightness and may have good optical performance in the center and periphery portions of the FOV.

$$0.5 < EPD/L1R1 < 8 \quad \text{[Equation 43]}$$

Equation 42 represents the relationship between the size of the entrance pupil of the optical system and the radius of curvature of the first surface S1 of the first lens 101, and may control incident light.

$$-3 < f1/f3 < 0 \quad \text{[Equation 44]}$$

In Equation 44, f1 means the focal length (mm) of the first lens 101, and f3 means the focal length (mm) of the third lens 103. When the optical system 1000 according to the embodiment satisfies Equation 44, the first lens 101 and the third lens 103 may have appropriate refractive power for controlling the incident light path and improve resolution.

$$1 < f13/F < 5 \quad \text{[Equation 45]}$$

27

In Equation 45, f13 means the composite focal length (mm) of the first to third lenses 101, 102, and 103, and F means the total focal length (mm) of the optical system 1000. Equation 45 establishes a relationship between the focal length of the first lens group G1 and the total focal length. When the optical system 1000 according to the embodiment satisfies Equation 45, the optical system 1000 may control the TTL of the optical system 1000.

$$0 < |f47/f13| < 2 \qquad \text{[Equation 46]}$$

In Equation 46, f13 means the composite focal length (mm) of the first to third lenses 101, 102, and 103, and f47 means the composite focal length (mm) of the fourth to seventh lenses 104, 105, 106, and 107. Equation 46 establishes a relationship between the focal length of the first lens group G1 and the focal length of the second lens group G2. In the embodiment, the composite focal length of the first to third lenses 101, 102, and 103 may have a positive (+) value, and the composite focal length of the fourth to seventh lenses 104, 105, 106, and 107 may have a negative (−) value. When the optical system 1000 according to the embodiment satisfies Equation 46, the optical system 1000 may improve aberration characteristics such as chromatic aberration and distortion aberration.

$$2 < TTL < 20 \qquad \text{[Equation 47]}$$

In Equation 47, TTL means the distance (mm) from the apex of the first surface S1 of the first lens 101 to the upper surface of the image sensor 300 in the optical axis OA. By setting the TTL to less than 20 in Equation 47, a slim and compact optical system may be provided.

$$2 < ImgH \qquad \text{[Equation 48]}$$

Equation 48 makes the diagonal size of the image sensor 300 exceed 4 mm, thereby providing an optical system with high resolution.

$$BFL < 2.5 \qquad \text{[Equation 49]}$$

Equation 42 may secure the installation space of the filter 500 by making the BFL (Back focal length) less than 2.5 mm, improve the assembly of the components, and improve coupling reliability through the distance between the image sensor 300 and the last lens.

$$2 < F < 20 \qquad \text{[Equation 50]}$$

In Equation 50, the total focal length (F) may be set according to the optical system.

$$FOV < 120 \qquad \text{[Equation 51]}$$

28

In Equation 51, a field of view (FOV) means a degree of view of the optical system 1000, and an optical system of less than 120 degrees may be provided. The FOV may be 80 degrees or less.

$$0.5 < TTL/CA\_Max < 2 \qquad \text{[Equation 52]}$$

In Equation 52, CA_Max means the largest effective diameter (mm) among the object-side and sensor-side surfaces of the plurality of lenses, and TTL means the distance (mm) from the apex of the first surface S1 of the first lens 101 to the upper surface of the image sensor 300 in the optical axis OA. Equation 52 establishes a relationship between the total optical axis length and the maximum effective diameter of the optical system, thereby providing a slim and compact optical system.

$$0.4 < TTL/ImgH < 3 \qquad \text{[Equation 53]}$$

Equation 53 may set the TTL of the optical system and the diagonal length (ImgH) of the image sensor 300 from the optical axis. When the optical system 1000 according to the embodiment satisfies Equation 53, the optical system 1000 may secure a BFL to apply a relatively large image sensor 300, for example, a large image sensor 300 around 1 inch, and thus may have a smaller TTL, high-definition implementation and a slim structure.

$$0.01 < BFL/ImgH < 0.5 \qquad \text{[Equation 54]}$$

Equation 54 may set the distance between the optical axis between the image sensor 300 and the last lens, and the length in the diagonal direction from the optical axis of the image sensor 300. When the optical system 1000 according to the embodiment satisfies Equation 54, the optical system 1000 may secure a BFL to apply a relatively large image sensor 300, for example, a large image sensor 300 around 1 inch, and may minimize the distance between the last lens and the image sensor 300, so that good optical characteristics may be obtained at the center and the periphery portions of the FOV.

$$4 < TTL/BFL < 10 \qquad \text{[Equation 55]}$$

Equation 55 may set (unit, mm) the total length (TTL) in the optical axis of the optical system, and the optical axis distance (BFL) between the image sensor 300 and the last lens. When the optical system 1000 according to the embodiment satisfies Equation 55, the optical system 1000 secures the BFL and may be provided slim and compact.

$$0.5 < F/TTL < 1.5 \qquad \text{[Equation 56]}$$

Equation 56 may set the total focal length (F) and the total length (TTL) in the optical axis of the optical system 1000.

Accordingly, a slim and compact optical system may be provided.

$$3 < F/BFL < 10 \qquad \text{[Equation 57]}$$

Equation 57 may set (unit, mm) the total focal length (F) of the optical system 1000 and the optical axis distance (BFL) between the image sensor 300 and the last lens. When the optical system 1000 according to the embodiment satisfies Equation 57, the optical system 1000 may have a set angle of view, may have an appropriate focal length, and may provide a slim and compact optical system. In addition, the optical system 1000 may minimize the distance between the last lens and the image sensor 300, so that it may have good optical characteristics in the periphery portion of the FOV.

$$0.1 < F/ImgH < 1 \qquad \text{[Equation 58]}$$

Equation 58 may set the total focal length (F, mm) of the optical system 1000 and the diagonal length (ImgH) of the image sensor 300 from the optical axis. The optical system 1000 may have improved aberration characteristics by applying a relatively large image sensor 300, for example, a large image sensor 300 of around 1 inch.

$$1 \le F/EPD < 5 \qquad \text{[Equation 59]}$$

Equation 59 may set the total focal length (F, mm) and entrance pupil size of the optical system 1000. Accordingly, the overall brightness of the optical system may be controlled.

$$Z = \frac{cr^2}{1 + \sqrt{1 - (1 + k)c^2 r^2}} + u^4 \sum_{m=0}^{13} a_m Q_m^{con}(u^2) \qquad \text{[Equation 60]}$$

The meaning of each item in Equation 60 is as follows.
Z: The sag of the surface parallel to the Z-axis (in lens units)
c: The vertex curvature (CUY)
k: The conic constant
r: The radial distance
$r_n$: The normalization radius (NRADIUS)
u: $r/r_n$
am: The $m^{th}Q^{con}$ coefficient, which correlates to surface sag departure
$Q_m^{con}$: The $m^{th}$Qcon polynomial
The optical system 1000 according to the embodiment may satisfy at least one or two or more of Equations 1 to 59. In this case, the optical system 1000 may have improved optical characteristics. In detail, when the optical system 1000 satisfies at least one or two or more of Equations 1 to 59, the optical system 1000 has improved resolution and may improve aberration and distortion characteristics. In addition, the optical system 1000 may secure a BFL (Back focal length) for applying the large-size image sensor 300, and may minimize the distance between the last lens and the image sensor 300, thereby having good optical performance at the center and periphery portions of the FOV. In addition, when the optical system 1000 satisfies at least one of Equations 1 to 59, it may include a relatively large image sensor 300 and have a relatively small TTL value, and a slimmer compact optical system and a camera module having the same may be provided.

In the optical system 1000 according to the embodiment, the distance between the plurality of lenses 100 may have a value set according to the region. FIG. 4 is a table showing a distance between two adjacent lenses in the optical system of FIG. 1.

Referring to FIGS. 4 and 1, in the first lens group G1, the first lens 101 and the second lens 102 may be spaced apart from each other by a first distance d12. The first distance d12 may be a distance between the first lens 101 and the second lens 102 in the direction Z of the optical axis. The first distance may change according to a position in the first direction Y in a region between the first lens 101 and the second lens 102. In detail, the first distance d12 may change from the optical axis OA to the first direction Y when the optical axis OA is used as the start point and the end of the effective region of the third surface S3 of the second lens 102 is used as the end point.

The first distance d12 decreases from the optical axis OA to a first point in the range of 40% to 60%, and increases again from the first point to an end point. In the first distance d12, the maximum value may be less than or equal to 1.8 times the minimum value, for example, in the range of 1.2 to 1.8 times the minimum value. Accordingly, the optical system 1000 may effectively control incident light. In detail, as the first lens 101 and the second lens 102 are spaced apart by a first distance d12 set according to the position, the light incident through the first and second lenses 101 and 102 may proceed with other lenses and maintain good optical performance.

The second lens 102 and the third lens 103 may be spaced apart from each other by a second distance d23. The second distance d23 may be a distance between the second lens 102 and the third lens 103 in the direction Z of the optical axis. The second distance may change along the first direction Y in a region between the second lens 102 and the third lens 103. In detail, when the start point is the optical axis OA and the end of the effective region of the fifth surface S5 of the third lens 103 is the end point, the second distance d23 may be change from the start point toward the end point.

The second distance d23 may increase in the first direction Y toward the end point from the optical axis OA. The second distance d23 may be minimum at the optical axis OA or the start point and maximum at the end point. The maximum value of the second distance d23 may be more than three times the minimum value. In detail, the maximum value of the second distance d23 may satisfy 3 to 7 times the minimum value. Accordingly, the optical system 1000 may have improved optical characteristics. In detail, as the second lens 102 and the third lens 103 are separated by the second distance d23 set according to their positions, the aberration characteristics of the optical system 1000 may be improved. The maximum value of the first distance d12 may be 1.5 times greater than the maximum value of the second distance d23, and the minimum value of the first distance d12 may be greater than the maximum value of the second distance d23.

The first lens group G1 and the second lens group G2 may be spaced apart from each other by a third distance d34. In detail, the third lens 103 and the fourth lens 104 may be spaced apart from the third distance d34. The third distance d34 may be a distance between the third lens 103 and the fourth lens 104 in the direction Z of the optical axis. The third distance d34 may change according to positions between the third lens 103 and the fourth lens 104. In detail, when the optical axis OA is the start point and the end of the effective region of the sixth surface S6 of the third lens 103 is the end point, the third distance d34 may change from the optical axis toward the first direction Y perpendicular to the optical axis.

The third distance d34 may gradually decrease toward an end point of the first direction Y from the optical axis OA. That is, the third distance may have a maximum value at the optical axis OA and a minimum value at the end point. The maximum value may be 1.5 times or more, for example, 1.5 times to 2.5 times the minimum value. The maximum value of the third distance d34 is 2 or more, for example, 2 to 2.5 times the maximum value of the second distance d23, and the minimum value may be 1.1 times or more, for example, in the range of 1.1 times to 1.5 times the maximum value of the second distance d23. Accordingly, the optical system 1000 may have improved optical characteristics. In detail, as the third lens 103 and the fourth lens 104 are separated by the third distance d34 set according to their position, the optical system 1000 may have improved chromatic aberration characteristics. In addition, the optical system 1000 may control vignetting characteristics.

In the second lens group G2, the fourth lens 104 and the fifth lens 105 may be spaced apart from each other by a fourth distance d45 in the direction Z of the optical axis. The fourth distance d45 may change along the first direction Y in a region between the fourth lens 104 and the fifth lens 105. In detail, when the optical axis is a start point and the end of the effective region of the eighth surface S8 of the fourth lens 104 is the end point, the fourth distance d45 may be changed in a form of increasing and decreasing in the first direction Y from the start point to the end point.

The minimum value of the fourth distance d45 is located at a point in the range of 40% to 60% of the distance from the optical axis OA or the starting point to the end point, and the fourth distance d45 may gradually increase toward the optical axis OA from the position of the minimum value and may gradually increase toward the end point from the position of the minimum value. Here, in the fourth distance d45, the distance at the optical axis OA may be smaller than the distance at the end point.

The maximum value of the fourth distance d45 may be 1.1 times or more, for example, 1.1 to 1.4 times the minimum value. The maximum value of the fourth distance d45 may be greater than the minimum value of the third distance d34 and may be smaller than the maximum value of the third distance d34. The value on the optical axis OA of the fourth distance d45 may be 0.8 times or less, for example, 0.5 to 0.8 times the value on the optical axis OA of the third distance d34. Accordingly, the optical system 1000 may have improved optical characteristics. In detail, as the fourth lens 104 and the fifth lens 105 are spaced apart by the fourth distance d45 set according to the position, the optical system 1000 may have good optical performance at the center and periphery portions of the angle of view FOV, and may adjust improved chromatic aberration and distortion aberration.

In the second lens group G2, the fifth lens 105 and the sixth lens 106 may be spaced apart from each other by a fifth distance d56 in the direction of the optical axis Z. When the start point is the optical axis OA and the end point of the effective region of the tenth surface S10 of the fifth lens 105 is the end point, the fifth distance d56 may change toward the first direction Y perpendicular to the optical axis OA. In the fifth distance d56, the maximum value is located in a range of 60% or more, for example, 60% to 70% of the distance from the optical axis OA to the end point, and the fifth distance d56 may gradually decrease toward the optical axis from the position of the maximum value, and may gradually decrease toward the end point from the position of the maximum value. The minimum value of the fifth distance d56 is located on the optical axis, and the maximum value may be three times or more, for example, three to four times the minimum value. The minimum value of the fifth distance d56 may be smaller than the minimum value of the third distance d34, and the maximum value may be greater than the maximum value of the third distance d34. Accordingly, the optical system 1000 may have improved optical characteristics in the center and periphery portions of the field of view (FOV). In addition, the optical system 1000 may have improved aberration control characteristics as the fifth lens 105 and the sixth lens 106 are spaced apart at a fifth distance d56 set according to the position, and the sixth lens 106 may have an improved aberration control characteristic, and the size of the effective diameter of the lens 106 may be appropriately controlled.

In the second lens group G2, the sixth lens 106 and the seventh lens 107 may be spaced apart from the sixth distance d67 to the optical axis Z. When the start point is the optical axis OA and the end point of the effective region of the twelfth surface S12 of the sixth lens 106 is the end point, the sixth distance D67 may change from the optical axis OA toward the first direction Y perpendicular to the optical axis OA. The sixth distance d67 has a maximum value on the optical axis OA, and the minimum value may be located in the range of 68% to 80% at least 68% of the distance from the optical axis to the end point. The sixth distance d67 gradually increases toward the optical axis OA at the position of the minimum value, and may gradually grow toward the end point at the position of the minimum value. The maximum value of the sixth distance d67 may be at least twice the minimum value, for example, in a range of 2 to 3 times. The maximum value of the sixth distance d67 may be at least twice as much as the maximum value of the third distance d67, such as a range of 2 to 3 times, and the minimum value may be greater than the maximum value of the third distance d34. Accordingly, the optical system 1000 may have improved optical properties in the center and periphery portions of the angle of view of the angle of view. In addition, the optical system 1000 may improve the distortion and aberration characteristics of the peripheral portion of the angle of view FOV as the sixth lens 106 and the seventh lens 107 are spaced apart by the sixth distance D67 set according to the positions.

The optical system 1000 according to the embodiment will be described in more detail with the following drawings.

Referring to FIGS. 1 to 6, the optical system 1000 according to the first embodiment may include the first lens 101, the second lens 102, the third lens 103, the fourth lens 104, the 5th The lens 105, the sixth lens 106, the seventh lens 107, and the image sensor 300. The first to seventh lenses 101, 102, 103, 104, 105, 106, and 107 may be disposed sequentially along the optical axis of the optical system 1000. The object side surface S3 of the second lens 102 may serve as an aperture stop. The filter 500 may be disposed between the plurality of lenses and the image sensor 300. In detail, the filter 500 may be disposed between the seventh lens 107 and the image sensor 300.

Table 1 is an example of lens data of the optical system of FIG. 1.

TABLE 1

| Lens | Surface | Radius (mm) of curvature | Thickness (mm)/ Distance (mm) | Reflective Index | Abbe number | Effective diameter (mm) |
|---|---|---|---|---|---|---|
| Lens 1 | S1 | 2.803 | 0.647 | 1.537 | 55.710 | 3.640 |
| | S2 | 5.394 | 0.218 | | | 3.507 |
| Lens 2 | S3 (Stop) | 6.474 | 0.537 | 1.537 | 55.710 | 3.428 |
| | S4 | −79.316 | 0.030 | | | 3.327 |
| Lens 3 | S5 | 10.058 | 0.250 | 1.686 | 18.411 | 3.163 |
| | S6 | 4.741 | 0.726 | | | 2.900 |
| Lens 4 | S7 | −35.230 | 0.388 | 1.537 | 55.710 | 3.500 |
| | S8 | −18.271 | 0.483 | | | 4.146 |
| Lens 5 | S9 | −8.165 | 0.339 | 1.686 | 18.411 | 5.723 |
| | S10 | 103.878 | 0.246 | | | 6.233 |
| Lens 6 | S11 | 2.590 | 0.758 | 1.595 | 30.377 | 6.884 |
| | S12 | 6.380 | 1.727 | | | 7.675 |
| Lens 7 | S13 | 5.371 | 0.391 | 1.537 | 55.710 | 10.073 |
| | S14 | 2.062 | 0.250 | | | 10.791 |
| Filter | | Infinity | 0.110 | | | 13.276 |
| | | Infinity | 0.755 | | | 13.358 |
| Image sensor | | Infinity | −0.005 | | | 14.300 |

Table 1 shows the radius of curvature, the thickness of the lens, the distance between the lenses, the refractive index in the d-line, the Abbe number, and the size of the effective diameter (CA: clear aperture) of the first to seventh lenses 101, 102, 103, 104, 105, 106, and 107 in the optical axis OA in FIG. 1. The first lens 101 of the optical system 1000 according to the embodiment may have positive (+) refractive power on the optical axis OA. The first surface S1 of the first lens 101 may have a convex shape on the optical axis OA or paraxial region, and the second surface S2 may have a concave shape on the optical axis OA or paraxial region. The first lens 101 may have a meniscus shape convex from the optical axis OA toward the object side. The first surface S1 and the second surface S2 may have aspheric coefficients as shown in FIG. 3 below.

The second lens 102 may have positive (+) refractive power in the optical axis OA. The third surface S3 of the second lens 102 may have a convex shape on the optical axis OA or paraxial region, and the fourth surface S4 may have a convex shape on the optical axis OA or paraxial region. The second lens 102 may have a convex shape on both sides of the optical axis OA. The third surface S3 may be an aspherical surface, and the fourth surface S4 may be an aspheric surface. The third surface S3 and the fourth surface S4 may have aspheric coefficients as shown in FIG. 3 below.

The third lens 103 may have negative (−) refractive power on the optical axis OA. The fifth surface S5 of the third lens 103 may have a convex shape on the optical axis OA or paraxial region, and the sixth surface S6 may have a concave shape on the optical axis OA or paraxial region. The third lens 103 may have a meniscus shape convex from the optical axis OA toward the object side. The fifth surface S5 may be an aspheric surface, and the sixth surface S6 may be an aspheric surface. The fifth surface S5 and the sixth surface S6 may have aspheric coefficients as shown in FIG. 3 below.

The fourth lens 104 may have positive (+) refractive power on the optical axis OA. The seventh surface S7 of the fourth lens 104 may have a concave shape on the optical axis OA or paraxial region, and the eighth surface S8 may have a convex shape on the optical axis OA or paraxial region. The fourth lens 104 may have a convex meniscus shape toward the image sensor 300 from the optical axis OA. The seventh surface S7 may be an aspherical surface, and the eighth surface S8 may be an aspherical surface and may have an aspherical surface coefficient as shown in FIG. 3 below.

The fifth lens 105 may have negative (−) refractive power on the optical axis OA. The ninth surface S9 of the fifth lens 105 may have a concave shape on the optical axis OA or paraxial region, and the tenth surface S10 may have a concave shape on the optical axis OA or paraxial region. Both sides of the fifth lens 105 may have a concave shape. The ninth surface S9 may be an aspheric surface, and the tenth surface S10 may be an aspherical surface. The ninth surface S9 and the tenth surface S10 may have aspheric coefficients as shown in FIG. 2 below.

The sixth lens 106 may have positive (+) refractive power on the optical axis OA. The eleventh surface S11 of the sixth lens 106 may have a convex shape on the optical axis OA or paraxial region, and the twelfth surface S12 may have a concave shape on the optical axis OA or paraxial region. The sixth lens 106 may have a meniscus shape convex from the optical axis OA toward the object side. The eleventh surface S11 may be an aspherical surface, and the twelfth surface S12 may be an aspheric surface and may have an aspherical surface coefficient as shown in FIG. 3.

The seventh lens 107 may have negative (−) refractive power on the optical axis OA. The thirteenth surface S13 of the seventh lens 107 may have a convex shape on the optical axis OA or paraxial region, and the fourteenth surface S14 may have a concave shape on the optical axis OA or paraxial region. The seventh lens 107 may have a meniscus shape convex from the optical axis OA toward the object side. The thirteenth surface S13 may be an aspheric surface, and the fourteenth surface S14 may be an aspherical surface. The thirteenth surface S13 and the fourteenth surface S14 may have aspheric coefficients as shown in FIG. 3 below.

As shown in FIG. 2, the fourteenth surface S14 of the seventh lens 106 has a first critical point P1, the thirteenth surface S13 has a second critical point P2, and the twelfth surface S12 of the sixth lens 106 may have a third critical point P3, and the eleventh surface S11 may have a fourth critical point P4. The first critical point P1 may be located at a position less than 40% of the effective radius r7 of the fourteenth surface S14 of the seventh lens 106, for example, in a range of 20% to 40%. The second critical point P2 may be located within 20% or less of the effective radius of the thirteenth surface S13, for example, in a range of 10% to 20%. The third critical point P3 may be located at a position of 46% or more of the effective radius r6 of the twelfth surface S12, for example, in the range of 46% to 56% or in the range of 48% to 53% of the effective radius r6 of the twelfth surface S12. The fourth critical point P4 may be disposed at a position of 46% or more of the effective radius r5 of the eleventh surface S11, for example, in the range of 46% to 56% or in the range of 48% to 53% of the effective radius r5 of the eleventh surface S11.

Referring to FIG. 3, at least one lens surface of a plurality of lenses may include an aspherical surface having a 30th order aspherical surface coefficient. For example, the first to seventh lenses 101, 102, 103, 104, 105, 106, and 107 may include lens surfaces having a 30th order aspheric coefficient. As described above, an aspherical surface having the 30th order aspheric coefficient (value other than "0") may change the aspherical shape of the peripheral portion particularly greatly, so that the optical performance of the peripheral portion of the field of view (FOV) may be well corrected.

Distances between two lenses adjacent to each other in the optical system 1000 may be as shown in FIG. 4.

FIG. 4 may mean the distance in the optical axis (OA) direction between the sensor-side surface of the n−1-th lens and the object-side surface of the n-th lens facing each other. In detail, FIG. 4 may mean the distance between the two lenses in the direction of the optical axis OA measured from the height point of the 0.1 mm interval in the first direction Y perpendicular to the optical axis OA. At this time, the maximum height point of the two adjacent lenses may mean that the effective radius value of the lens surface with a small effective diameter (½ of the effective diameter size) of the sensor-side surface of the n−1th lens and the object-side surface of the nth lens, which may mean 0.1 mm intervals for the convenience of description. That is, the distance at the point of maximum height means the distance in the direction of the optical axis OA at the height of the effective radius of the lens surface having the smallest effective diameter size among the sensor-side surface of the n−1th lens and the object-side surface of the n-th lens facing each other. Since the ends of the effective radii of the object-side surface and the sensor-side surface of each lens may be different from each other, and the ends of the effective radii of the two adjacent lenses are different from each other, the distances d12, d23, d34, d45, d56, and d67 between adjacent lenses may be adjusted within ±0.1 mm of the end of the effective region in the Y direction. Alternatively, the first to sixth distances d12, d23, d34, d45, d56, and d67 may be set based on an end having a small effective radius among ends of an effective region of two adjacent lenses.

Table 2 relates to the items of the equations described above in the optical system 1000 of FIG. 1, total track length (TTL), back focal length (BFL), F value, ImgH, and the focal lengths f1, f2, f3, f4, f5, f6, and f7 of each of the first to seventh lenses 101, 102, 103, 104, 105, 106, and 107, the composite focal length, and the edge thickness ET and so on. Here, the edge thickness of the lens means the thickness in the direction Z of the optical axis at the end of the effective region of the lens. In detail, the edge thickness of the lens means the distance from the end of the effective region on the object-side surface of the lens to the end of the effective region on the sensor-side surface in the direction of the optical axis OA. In addition, d (n−1, n)_ET means the distance between the end of the effective region on the sensor-side surface of the n−1th lens and the end of the nth lens effective region on the object-side surface of the nth lens facing each other in the direction of the optical axis (OA), and Air_Edge_Max means the largest value among the d (n−1, n)_ET values.

TABLE 2

| Item | Embodiment | Item | Embodiment |
|---|---|---|---|
| F | 6.973 mm | d12_ET | 0.3378 mm |
| f1 | 10.005 mm | d23_ET | 0.1901 mm |
| f2 | 11.180 mm | d34_ET | 0.2037 mm |
| f3 | −13.321 mm | d45_ET | 0.4039 mm |
| f4 | 70.175 mm | d56_ET | 0.0932 mm |
| f5 | −11.015 mm | d67_ET | 1.0159 mm |
| f6 | 6.823 mm | \|L7S2_Max slope\| | 37 degrees |
| f7 | −6.509 mm | L7S2 Inflection Point | 0.31 |
| f_G1 | 8.234 mm | L7S2_Max_sag to Sensor | 0.898 mm |
| f_G2 | −6.057 mm | Air_Edge_Max | 0.544 mm |
| f_Aver | 9.620 mm | ΣL_CT | 3.309 mm |
| f1-3_Aver | 2.622 mm | ΣAir_CT | 3.431 mm |
| f4-7_Aver | 14.869 mm | ΣIndex | 11.114 |
| L_G1 | 1.434 mm | ΣAbbe | 290.040 |
| L_G2 | 1.875 mm | L_CT_Max | 0.758 mm |
| L1_ET | 0.2999 mm | L_CT_Min | 0.250 mm |
| L2_ET | 0.2501 mm | L_CT_Aver | 0.473 mm |
| L3_ET | 0.3876 mm | CA_Max | 10.791 mm |
| L4_ET | 0.2636 mm | CA_Min | 2.900 mm |
| L5_ET | 0.2771 mm | CA_Aver | 5.356 mm |
| L6_ET | 0.3134 mm | TD | 6.989 mm |
| L7_ET | 0.5581 mm | TTL | 7.850 mm |
| F-number | 1.9533 | BFL | 1.110 mm |
| FOV | 45.035 degrees | ImgH | 14.30 mm |
| EPD | 3.569 mm | | |

Table 3 shows the result values of Equations 1 to 59 described above in the optical system 1000 of FIG. 1. Referring to Table 3, it may be seen that the optical system 1000 satisfies at least one, two or more, or three or more of Equations 1 to 59. In detail, it may be seen that the optical system 1000 according to the embodiment satisfies all of Equations 1 to 59 above. Accordingly, the optical system 1000 may have good optical performance at the center and the periphery of the field of view (FOV) and may have excellent optical characteristics as shown in FIGS. 5 and 6.

TABLE 3

| | Equations | Embodiment |
|---|---|---|
| Equation 1 | 2 < L1_CT/L3_CT < 4 | 2.589 |
| Equation 2 | 0.5 < L3_CT/L3_ET < 2 | 0.645 |
| Equation 3 | 1 < L7_ET/L7_CT < 5 | 1.428 |
| Equation 4 | 1.6 < n3 | 1.686 |
| Equation 5 | 0.5 < L7S2_Max_sag to Sensor < 2 | 0.898 |
| Equation 6 | 1 < BFL/L7S2_Max_sag to Sensor < 2 | 1.236 |
| Equation 7 | 5 < \|L7S2_Max slope\| < 45 | 37.000 |
| Equation 8 | 0.2 < L7S2 Inflection Point < 0.6 | 0.315 |
| Equation 9 | 1 < d67_CT/d67_Min < 10 | 2.036 |
| Equation 10 | 1 < d67_CT/ d67_ET < 5 | 1.700 |
| Equation 11 | 0.01 < d12_CT/d67_CT < 1 | 0.126 |
| Equation 12 | 1 < L1_CT/L7_CT < 5 | 1.656 |
| Equation 13 | 1 < L6_CT/L7_CT < 5 | 1.939 |
| Equation 14 | 1 < L1R1/L7R2 < 5 | 1.359 |
| Equation 15 | 0 < (d67_CT − d67_ET)/(d67_CT) < 2 | 0.735 |
| Equation 16 | 1 < CA_L1S1/CA_L3S1 < 1.5 | 1.151 |
| Equation 17 | 1 < CA_L7S2/CA_L4S2 < 5 | 2.603 |
| Equation 18 | 0.2 < CA_L3S2/CA_L4S1 < 1 | 0.829 |
| Equation 19 | 0.1 < CA_L5S2/CA_L7S2 < 1 | 0.578 |
| Equation 20 | 1 < d34_CT/d34_ET < 8 | 3.565 |
| Equation 21 | 1 < d67_CT/ d67_ET < 3 | 1.700 |
| Equation 22 | 0 < d67_Max/d67_CT < 2 | 1.000 |
| Equation 23 | 1 < L5_CT/d56_CT < 2 | 1.375 |
| Equation 24 | 0.1 < L6_CT/d67_CT < 1 | 0.439 |
| Equation 25 | 0.01 < L7_CT/ d67_CT < 1 | 0.226 |
| Equation 26 | 1 < \|L5R1/L5_CT\| < 100 | 24.103 |
| Equation 27 | 1 < \|L5R1/L7R1\| < 5 | 1.520 |
| Equation 28 | 0 < L_CT_Max/Air_Max < 2 | 0.439 |
| Equation 29 | 0.5 < ΣL_CT/ΣAir_CT < 2 | 0.964 |
| Equation 30 | 10 < ΣIndex < 30 | 11.114 |

TABLE 3-continued

| | Equations | Embodiment |
|---|---|---|
| Equation 31 | $10 < \Sigma Abb/\Sigma Index < 50$ | 26.097 |
| Equation 32 | $0 < |Max\_distoriton| < 5$ | 2.500 |
| Equation 33 | $0 < Air\_ET\_Max/L\_CT\_Max < 2$ | 1.341 |
| Equation 34 | $0.5 < CA\_L1S1/CA\_Min < 2$ | 1.255 |
| Equation 35 | $1 < CA\_Max/CA\_Min < 5$ | 3.721 |
| Equation 36 | $1 < CA\_Max/CA\_Aver < 3$ | 2.015 |
| Equation 37 | $0.1 < CA\_Min/CA\_Aver < 1$ | 0.541 |
| Equation 38 | $0.1 < CA\_Max/(2*ImgH) < 1$ | 0.377 |
| Equation 39 | $0.5 < TD/CA\_Max < 1.5$ | 0.648 |
| Equation 40 | $1 < F/L7R2 < 10$ | 3.381 |
| Equation 41 | $1 < F/L1R1 < 10$ | 2.487 |
| Equation 42 | $1 < EPD/L7R2 < 10$ | 1.731 |
| Equation 43 | $0.5 < EPD/L1R1 < 8$ | 1.273 |
| Equation 44 | $-3 < f1/f3 < 0$ | −0.751 |
| Equation 45 | $1 < f13/F < 5$ | 1.181 |
| Equation 46 | $0 < |f47/f13| < 2$ | 0.736 |
| Equation 47 | $2 < TTL < 20$ | 7.850 |
| Equation 48 | $2 < ImgH$ | 14.300 |
| Equation 49 | $BFL < 2.5$ | 1.110 |
| Equation 50 | $2 < F < 20$ | 6.973 |
| Equation 51 | $FOV < 120$ | 45.036 |
| Equation 52 | $0.5 < TTL/CA\_Max < 2$ | 0.727 |
| Equation 53 | $0.4 < TTL/ImgH < 3$ | 0.549 |
| Equation 54 | $0.01 < BFL/ImgH < 0.5$ | 0.078 |
| Equation 55 | $4 < TTL/ BFL < 10$ | 7.071 |
| Equation 56 | $0.5 < F/TTL < 1.5$ | 0.888 |
| Equation 57 | $3 < F/BFL < 10$ | 6.281 |
| Equation 58 | $0.1 < F/ImgH < 1$ | 0.488 |
| Equation 59 | $1 \le F/EPD < 5$ | 1.953 |

In detail, FIG. 5 is a graph of diffraction MTF characteristics of the optical system 1000 according to the embodiment, and FIG. 6 is a graph of aberration characteristics. This is a graph in which spherical aberration, astigmatic field curves, and distortion are measured from left to right in the aberration graph of FIG. 6. In FIG. 6, the X axis may represent a focal length (mm) and distortion (%), and the Y axis may represent the height of an image. In addition, the graph for spherical aberration is a graph for light in a wavelength band of about 470 nm, about 510 nm, about 555 nm, about 610 nm, and about 660 nm, and the graph for astigmatism and distortion aberration is a graph for light in a wavelength band of about 555 nm.

The diffraction MTF characteristic are measured from F1: Diff Limit and F1:(RIH)0.000 mm to F11:T(RIH)7.1500 mm and F11:R(RIH)7.1500 mm in units of approximately 0.7150 mm from the spatial frequency range of 0.000 mm to 5.000 mm. In the diffraction MTF graph, T represents the MTF change in spatial frequency per millimeter on a tangential circle, and R represents the MTF change in spatial frequency per millimeter on the radiation source. Here, the modulation transfer function (MTF) depends on the spatial frequency in cycles per millimeter.

In the aberration diagram of FIG. 6, it may be interpreted that the aberration correction function is better as each curve approaches the Y-axis. Referring to FIG. 6, in the optical system 1000 according to an embodiment, it may be seen that the measured values are adjacent to the Y-axis in most regions. That is, the optical system 1000 according to the embodiment may have improved resolution and good optical performance not only at the center portion of the field of view (FOV) but also at the periphery portion.

Figure 7:
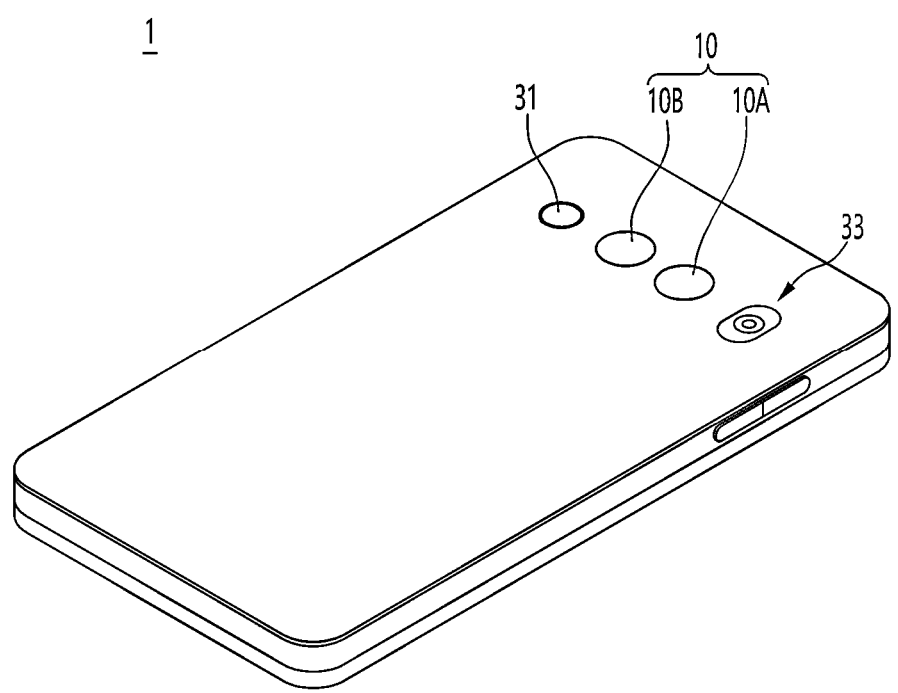
FIG. 7 is a diagram illustrating that a camera module according to an embodiment is applied to a mobile terminal.

FIG. 7 is a diagram illustrating that a camera module according to an embodiment is applied to a mobile terminal.

Referring to FIG. 7, the mobile terminal 1 may include a camera module 10 provided on the rear side. The camera module 10 may include an image capturing function. In addition, the camera module 10 may include at least one of an autofocus function, a zoom function, and an OIS function. The camera module 10 may process a still image or video frame obtained by the image sensor 300 in a shooting mode or a video call mode. The processed image frame may be displayed on a display unit (not shown) of the mobile terminal 1 and may be stored in a memory (not shown). In addition, although not shown in the drawings, the camera module may be further disposed on the front side of the mobile terminal 1. For example, the camera module 10 may include a first camera module 10A and a second camera module 10B. At this time, at least one of the first camera module 10A and the second camera module 10B may include the above-described optical system 1000. Accordingly, the camera module 10 may have a slim structure and may have improved distortion and aberration characteristics. In addition, the camera module 10 may have good optical performance even in the center and periphery portions of the field of view (FOV).

The mobile terminal 1 may further include an autofocus device 31. The autofocus device 31 may include an autofocus function using a laser. The autofocus device 31 may be mainly used in a condition in which an autofocus function using an image of the camera module 10 is degraded, for example, a proximity of 10 m or less or a dark environment. The autofocus device 31 may include a light emitting unit including a vertical cavity surface emitting laser (VCSEL) semiconductor device and a light receiving unit such as a photodiode that converts light energy into electrical energy. The mobile terminal 1 may further include a flash module 33. The flash module 33 may include a light emitting element emitting light therein. The flash module 33 may be operated by a camera operation of a mobile terminal or a user's control.

Features, structures, effects, etc. described in the embodiments above are included in at least one embodiment of the invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the invention. Although described based on the embodiments, this is only an example, this invention is not limited, and it will be apparent to those skilled in the art that various modifications and applications not illustrated above are possible without departing from the essential characteristics of this embodiment. For example, each component specifically shown in the embodiment can be modified and implemented. And the differences related to these modifications and applications should be construed as being included in the scope of the invention as defined in the appended claims.

The invention claimed is:

1. An optical system comprising:

first to seventh lenses disposed along an optical axis from an object side toward a sensor side, wherein the first lens has a positive (+) refractive power on the optical axis, wherein the seventh lens has negative (−) refractive power on the optical axis, wherein an object-side surface of the first lens has a convex shape on the optical axis, wherein a sensor-side surface of the third lens has a maximum effective diameter among the first to seventh lenses, wherein a sensor-side surface of the seventh lens has a maximum effective diameter among the first to seventh lenses, wherein a composite focal length of the first to third lenses has a positive (+) value, wherein a composite focal length of the fourth to seventh lenses has a negative (−) value, and wherein the optical system that satisfies the following Equations:

$$0.4 < TTL/ImgH < 3$$

$$1 < CA\_Max/CA\_Min < 5$$

(TTL (Total track length) is a distance from an apex of the object-side surface of the first lens to an upper surface of an image sensor, ImgH is ½ of a maximum diagonal length of the image sensor, CA_Max is a largest effective diameter among effective diameters of object-side and sensor-side surfaces of the first to seventh lenses, and CA_Min is a smallest effective diameter among the effective diameters of the object-side and sensor-side surfaces of the first to seventh lenses).

2. The optical system of claim 1, wherein the third and seventh lenses satisfy equation:

$$2 < AVR\_CA\_L7/AVR\_CA\_L3 < 4$$

(AVR_CA_L7 is an average value of effective diameters of the object-side surface and a sensor-side surface of the seventh lens, and AVR_CA_L3 is an average value of effective diameters of an object-side surface and the sensor-side surface of the third lens).

3. The optical system of claim 1, wherein an effective diameter of the object-side surface of the seventh lens satisfies the following equation:

$$2 \le CA\_L7S1/AVR\_CA\_L3 \le 4$$

(CA_L7S1 is the effective diameter (mm) of the object-side surface of the seventh lens, and AVR_CA_L3 is an average value of the effective diameters of an object-side surface and the sensor-side surface of the third lens).

4. The optical system of claim 1, wherein the effective diameter of the sensor-side surface of the seventh lens satisfies the following equation:

$$2 \le CA\_L7S2/AVR\_CA\_L3 < 5$$

(CA_L7S2 is the effective diameter (mm) of the sensor-side surface of the seventh lens, and the AVR_CA_L3 is an average value of effective diameters of an object-side surface and the sensor-side surface of the third lens).

5. The optical system of claim 1, wherein the first and seventh lenses satisfy the following equation:

$$1 < L1\_CT/L7\_CT < 5$$

(L1_CT is a thickness of the first lens on the optical axis, and L7_CT is a thickness of the seventh lens on the optical axis).

6. The optical system of claim 1, wherein a distance between the third and fourth lenses on the optical axis and a distance between the sixth and seventh lenses on the optical axis satisfy the following equation:

$$1 < d67\_CT/d34\_CT < 4$$

(d34_CT is the distance (mm) between the third lens and the fourth lens on the optical axis, and d67_CT is the distance (mm) between a sensor-side surface of the sixth lens and the object-side surface of the seventh lens on the optical axis).

7. The optical system of claim 1, wherein the effective diameter of the sensor-side surface of the seventh lens and a distance between the sixth and seventh lenses on the optical axis satisfy the following equation:

$$3 < CA\_L7S2/d67\_CT < 10$$

(CA_L7S2 is an effective diameter of the largest lens surface, and is the effective diameter of the sensor-side surface of the seventh lens, and d67_CT is the distance (mm) between a sensor-side surface of the sixth lens and an object-side surface of the seventh lens on the optical axis).

8. The optical system of claim 1, comprising:

an aperture stop disposed between the first lens and the second lens, wherein the sensor-side surface of the seventh lens has a critical point and satisfies the following equation:

$$0.5 < L7S2\_Max\_sag \text{ to Sensor} < 2$$

(L7S2_Max_sag to Sensor is a distance from a maximum sag value of the sensor-side surface of the seventh lens to the image sensor in a direction of the optical axis).

9. A camera module comprising:

an image sensor; and a filter disposed between the image sensor and a last lens of an optical system, wherein the optical system includes an optical system according to claim 1, and wherein the camera module that satisfies the following equation:

$$1 \le F/EPD < 5$$

(F is a total focal length of the optical system, and E is an entrance pupil diameter of the optical system).

10. An optical system comprising:

first and second lens groups disposed along an optical axis from an object side toward a sensor side and including at least one lens, wherein the first lens group has a positive (+) refractive power on the optical axis, wherein the second lens group has a negative (−) refractive power on the optical axis, wherein a total sum of a number of lenses included in the first and second lens groups is 7, wherein the number of lenses in the second lens group is greater than the number of lenses in the first lens group, wherein an effective diameter of a sensor-side surface closest to the second lens group among lens surfaces of the first lens group is a minimum, wherein an effective diameter of a sensor-side surface closest to an image sensor among lens surfaces of the second lens group is a maximum, wherein the optical system that satisfies the following equations:

$$0.4 < TTL/ImgH < 3$$

$$1 < TD/CA\_Min < 1.5$$

(TTL (Total track length) is a distance from an apex of an object-side surface of a first lens to an upper surface of the image sensor in the optical axis, ImgH is ½ of a maximum diagonal length of the image sensor, and TD is a maximum distance (mm) from an object-side surface of the first lens group to a sensor-side surface of the second lens group in the optical axis, and CA_Max is a largest effective diameter among effective diameters of an object-side surfaces and a sensor-side surfaces of first to seventh lenses).

11. The optical system of claim 10, wherein an absolute value of a focal length of each of the first and second lens groups is greater in the first lens group than in the second lens group.

12. The optical system of claim 10, wherein a sensor-side surface of the first lens group closest to the second lens group among lens surfaces of the first and second lens groups has a minimum effective diameter, and wherein a sensor-side surface of the second lens group closest to the image sensor among the lens surfaces of the first and second lens groups has a maximum effective diameter.

13. The optical system of claim 10, wherein the first lens group includes the first to third lenses disposed along the optical axis from the object side toward the sensor side, wherein the second lens group includes the fourth to seventh lenses disposed along the optical axis from the object side toward the sensor side, wherein one of the object-side and sensor-side surfaces of the third lens has a minimum effective diameter, and wherein one of the object-side and sensor-side surfaces of the seventh lens has a maximum effective diameter.

14. The optical system of claim 13, wherein a distance between the sixth and seventh lenses on the optical axis and a distance between the third and fourth lenses on the optical axis satisfy the following equation:

$$1 < d67\_CT/d34\_CT < 4$$

(d34_CT is a distance (mm) on the optical axis between the third lens and the first lens distance, and d67_CT is a distance (mm) on the optical axis OA between the sensor-side surface of the sixth lens and the object-side surface of the seventh lens).

15. The optical system of claim 13, wherein a distance between the second lens group and the sixth and seventh lenses on the optical axis satisfies the following equation:

$$1 < G2\_TD/d67\_CT < 4$$

(G2_TD is a maximum distance (mm) on the optical axis from an object-side surface to a sensor-side surface of the second lens group, and d67_CT is a distance (mm) on the optical axis OA between the sensor-side surface of the sixth lens and the object-side surface of the seventh lens).

16. The optical system of claim 13, wherein a distance between the first lens group and the first and second lens groups satisfies the following equation:

$$1 < G1\_TD/d34\_CT < 4$$

(G1_TD is a distance (mm) on the optical axis from the object-side surface of the first lens to the sensor-side surface of the third lens, and d34_CT is a distance (mm) on the optical axis between a sensor-side surface of the third lens of the first lens group and an object-side surface of the fourth lens of the second lens group).

17. The optical system of claim 13, wherein a center thickness of the first lens, a distance on the optical axis between the third and fourth lenses, and a center thickness of the sixth lens satisfy the following equation:

$$L1\_CT < d34\_CT < L6\_CT$$

(L1_CT is the center thickness of the first lens, which is a thickest in the first lens group, d34_CT is the distance on the optical axis between the third and fourth lenses, and L6_CT is the center thickness of the sixth lens having a critical point in the second lens group).

18. An optical system comprising:

first to seventh lenses disposed along an optical axis from an object side toward a sensor side; and an aperture stop disposed between the first lens and the second lens, wherein the first lens has a positive (+) refractive power on the optical axis, wherein the seventh lens has negative (−) refractive power on the optical axis, wherein a sensor-side surface of the third lens has a concave shape on the optical axis, wherein an object-side surface of the fourth lens has a concave shape on the optical axis, wherein at least one of object-side and sensor-side surfaces of the sixth lens has a critical point, wherein at least one of object-side and sensor-side surfaces of the seventh lens has a critical point, wherein the sensor-side surface of the third lens has a minimum effective diameter among the first to seventh lenses, wherein the sensor-side surface of the seventh lens has a maximum effective diameter among the first to seventh lenses, wherein a composite focal length of the first to third lenses has a positive (+) value, and wherein the optical system that satisfies the following equation:

$$1 < CA\_Max/CA\_Min < 5$$

(CA_Max is a maximum effective diameter among effective diameters of object-side and sensor-side surfaces of the first to seventh lenses, and CA_Min is a minimum effective diameter among the effective diameters of the object-side and sensor-side surfaces of the first to seventh lenses).

19. The optical system of claim 18, wherein the critical point of the sensor-side surface of the seventh lens is located at a position less than 40% of a distance from the optical axis to an end of an effective region of the sensor-side surface of the seventh lens, and wherein the critical point of the object-side surface of the seventh lens is located closer to the optical axis than the critical point of the sensor-side surface of the seventh lens.

20. The optical system of claim 18, wherein the critical point of the sensor-side surface and the critical point of the object-side surface of the sixth lens are in a range of 46% to 56% of a distance from the optical axis to an end of an effective region of the sixth lens.

\* \* \* \* \*